United States Patent [19]

Polmanteer et al.

[11] 4,418,165

[45] Nov. 29, 1983

[54] OPTICALLY CLEAR SILICONE COMPOSITIONS CURABLE TO ELASTOMERS

[75] Inventors: Keith E. Polmanteer; Harry L. Chapman, both of Midland, Mich.

[73] Assignee: Dow Corning Corporation, Midland, Mich.

[21] Appl. No.: 309,302

[22] Filed: Oct. 7, 1981

Related U.S. Application Data

[63] Continuation-in-part of Ser. No. 156,003, Jun. 3, 1980, abandoned.

[51] Int. Cl.³ ............................................. C08L 83/06
[52] U.S. Cl. .................................... 523/210; 523/107; 523/113; 523/209; 523/212
[58] Field of Search ................ 523/107, 209, 212, 210

[56] References Cited

U.S. PATENT DOCUMENTS

| | | | |
|---|---|---|---|
| 2,786,042 | 3/1957 | Iler | 260/37 SB |
| 2,870,108 | 1/1959 | Nickerson | 524/261 |
| 2,870,109 | 1/1959 | Nickerson | 524/266 |
| 3,036,985 | 5/1962 | Daudt | 260/37 SB |
| 3,228,741 | 1/1966 | Becker | 351/160 R |
| 3,408,325 | 10/1968 | Hittmair et al. | 528/28 |
| 3,474,064 | 10/1969 | Hittmair et al. | 260/37 SB |
| 3,624,023 | 11/1971 | Hartlage | 260/37 SB |
| 3,915,924 | 10/1975 | Wright | 260/37 SB |
| 3,996,187 | 12/1976 | Travnicek | 260/37 SB |
| 3,996,189 | 12/1976 | Travnicek | 260/37 SB |
| 4,001,168 | 1/1977 | Maass et al. | 524/863 |
| 4,008,198 | 2/1977 | Krohberger et al. | 260/37 SB |

FOREIGN PATENT DOCUMENTS

| | | | |
|---|---|---|---|
| 53-117051 | 10/1978 | Japan . | |
| 805102 | 11/1958 | United Kingdom . | |
| 807454 | 1/1959 | United Kingdom | 523/212 |
| 922871 | 4/1963 | United Kingdom . | |

OTHER PUBLICATIONS

40 Page Cabot Cororation Bulletin 2313/774/10M Entitled "Cab–O–Sil ® Properties and Functions", See pp. 8 and 11 for Silica Filler Information.

Report No. ER–CR–76040 Entitled "Material Studies for Protective Masks" by R. Chaffee, Report Dated Sep., 1976 on Gov'T. Contract No. DAAA15-6-9-C-0291 to Edgewood Arsenal, Md. pp. 1-3, 8-9, 77-104, 217-221, Particularly See pp. 77-83 on Refractive Index Matching.

*Primary Examiner*—Wilbert J. Briggs, Sr.
*Attorney, Agent, or Firm*—Richard E. Rakoczy

[57] ABSTRACT

Optically clear silicone compositions comprising 100 parts by weight of at least one polydiorganosiloxane and 15 to 120 parts by weight of a hydrophobic reinforcing silica filler wherein substantially all of the surface-treated silica filler particles are sufficiently small in their largest dimensions such that a uniform 2.54 mm thickness of the composition possesses a haze value of less than 4% and a luminous transmittance value of at least 85% according to ASTM D1003-61. The refractive index of the polydiorganosiloxane does not have to be matched with that of the silica filler to obtain optically clear compositions. The haze value of certain of such compositions does not increase by more than 1% per 2.54 mm thickness when the composition is heated from 23°±2° C. to 100°±5° C. Optionally, curing agents and other additives can be present in the compositions. Optically clear cured elastomers useful as lenses or tubing can be prepared from such elastomers. Methods for the preparation of such compositions are also claimed.

76 Claims, No Drawings

OPTICALLY CLEAR SILICONE COMPOSITIONS CURABLE TO ELASTOMERS

This application is a continuation-in-part of application Ser. No. 156,003, filed June 3, 1980, now abandoned.

BACKGROUND OF THE INVENTION

1. Field of the Invention

This invention relates to optically clear silicone compositions which are curable to elastomers comprising at least one polydiorganosiloxane and a hydrophobic reinforcing silica filler wherein the silica filler particles are sufficiently small in their largest dimensions that optically clear compositions result even when the refractive index of the polydiorganosiloxane is not matched with that of the filler. This invention also relates to a method of preparing such compositions. This invention also relates to the optically clear elastomers obtained when such compositions are cured.

2. Description of the Prior Art

Silicone elastomers, more commonly known as silicone rubbers, fine use in many diverse areas such as sealants, tubing, prosthetic devices, wire insulation, molding compounds, contact lenses, solvent resistant hoses and many other uses. In applications where optical clarity is a necessity, compositions consisting of polydiorganosiloxanes such as polydimethylsiloxane gums can be vulcanized or cured to form optically clear elastomeric products. However, when the cured elastomer consists solely of a cured polydiorganosiloxane, the physical properties of the elastomer are poor. To improve these properties, reinforcing fillers such as finely divided silica are added to the gum prior to curing. A surface-treated (hydrophobic) reinforcing silica filler is often employed because such a filler not only improves the physical properties of the cured elastomer as compared with curing the polydiorganosiloxane alone, but also avoids the well-known problem of crepe-aging or structuring of the uncured composition. The addition of hydrophobic reinforcing silica fillers has the disadvantage of increasing the optical haze of the compositions and cured elastomers depending upon the types and amounts of polydiorganosiloxanes, filler and other components present in the formulation.

Thus the compositions and cured elastomers are no longer as optically clear as the cured polydiorganosiloxanes themselves although they may appear transparent in thin sheets where the haze is less noticeable. Contact lenses consisting of transparent silicone rubber containing silica fillers are described in U.S. Pat. No. 3,228,741 to Becker and British Pat. No. 922,871. Transparent room-temperature vulcanizable silicone rubber stocks are described in U.S. Pat. No. 3,408,325 to Hittmair et al. and in U.S. Pat. No. 3,474,064 also to Hittmair et al. Hittmair et al. teach compositions which can also contain fillers. The latter '0.64 patent teaches that a cured elastomer derived from 100 parts of a hydroxyl-endblocked dimethylpolysiloxane, 10 parts of fume silica, 5 parts of a hydroxylated methylpolysiloxane fluid and a small amount of a curing agent was sufficiently transparent that print from a typewriter could readily be seen and read through a 4 millimeter (mm) sheet of the cured elastomer although nothing was mentioned regarding the haziness of the sample.

A commonly accepted explanation for the amount of haze which results when a silica filler is added to a polydiorganosiloxane which would otherwise cure to form an optically clear elastomer is that the haze appears to be related to the difference in refractive index at 25° C., Sodium D wavelength (R.I.) between the silica filler (R.I. approximately 1.42 to 1.46) and the polydiorganosiloxane. The haze is apparent to the naked eye in 2.54 mm (100 mil) thicknesses when a hydrophobic reinforcing silica filler is mixed with a polydimethylsiloxane gum (R.I. approximately 1.40) and especially when mixed with a fluorine-containing polydiorganosiloxane gum such as poly-3,3,3-trifluoropropylmethylsiloxane gum (R.I. approximately 1.38). One prior art solution to the problem of haziness involves the use of polydiorganosiloxanes containing silicon-bonded organic radicals such as phenyl radicals in sufficient amounts such that the refractive index of the polydiorganosiloxanes in the composition matches the refractive index of the silica filler, thereby obtaining optically clear compositions and cured elastomers. Examples of such an approach are found in U.S. Pat. Nos. 3,996,189 and 3,996,187, both to Travnicek, which teach optically clear silicone elastomers and contact lenses reinforced with fume silica fillers. These patents teach that 80 to 95 parts of one or two polydiorganosiloxanes containing from 6 to 16 mole percent phenyl groups can be mixed with from 5 to 20 parts of a fume silica to obtain optically clear reinforced silicone elastomers while a polydiorganosiloxane which is free of phenyl groups such as a dimethylpolysiloxane containing a small percentage of vinyl groups results in a hazy material which had inadequate optical clarity. In U.S. Pat. No. 3,624,023, Hartlage teaches compositions containing a surface-treated fume silica filler and a hydroxyl-enblocked polydiorganosiloxane containing phenylmethylpolysiloxane units which are vulcanizable to transparent silicone rubbers under ambient conditions.

In U.S. Pat. No. 4,008,198, Krohberger et al. teach that highly transparent or optically clear elastomers can be obtained by mixing (1) a nitrogen compound containing at least one triorganosilyl group of a particular type, (2) a hexaorganodisilazane, (3) silicon dioxide having a surface area of at least 50 m$^2$/g and (4) a highly viscous polydiorganosiloxane and then kneading the mixture at 150° C. under a vacuum until there is no evidence that nitrogen compounds are being evolved. The examples contained therein report that a composition prepared using a polydimethylsiloxane containing a small percentage of vinyl radicals possessed a light transparency value of 91% and a composition prepared using a polydimethylsiloxane containing 5.5 mole percent of diphenylsiloxane units and a larger percentage of methylvinylsiloxane units than in the previous example possessed a light transparency value of 96% which is consistent with the prior art technique of obtaining compositions possessing improved optical clarity by matching the refractive index of the filler with that of the polydiorganosiloxane. The haze value of each composition is not reported.

Iler, in U.S. Pat. No. 2,786,042, teaches the preparation of sols of surface-treated colloidal silica particles which are said to have an average diameter of from 10 to 150 millimicrons (100 to 1500 Angstroms). Iler teaches that such particles can be added to plastics in the form of an organosol to improve the physical properties of the plastics and teaches that even transparent or translucent plastics which have an index of refraction near that of colloidal silica will retain their transparency when filled.

One disadvantage possessed by the use of a refractive index matching technique is that one is necessarily limited in the choice of polydiorganosiloxanes which can be employed. Mixtures of polydiorganosiloxanes having similar refractive indices can be employed which, as a total mixture, match the refractive index of the silica filler, but this requires the use of extra ingredients and can thereby increase the cost of the optically clear composition. Batch-to-batch variations in the refractive index of the polydiorganosiloxanes may also affect the optical clarity of the composition and cured elastomer.

Another disadvantage of the refractive index matching technique is that such compositions and cured elastomers tend to increase in haze value with increasing temperature. This is believed to be the result of a change in the refractive index of the polydiorganosiloxane component of the mixture which is not matched by a corresponding change in the refractive index of the filler. Such an increase in haze can be detrimental where such cured elastomers are used as an interlayer in windshields used in supersonic aircraft where the windshields are known to heat up at high speeds due to the flow of air molecules across the windshield during flight.

Another approach to obtaining transparent compositions is exemplified by Daudt in U.S. Pat. No. 3,036,985 which employs a copolymeric filler composed of $QSiO_{3/2}$ units, $SiO_2$ units, $(CH_3)_2SiO$ units and $(CH_3)_3SiO_{1/2}$ units where Q is an aliphatic hydrocarbon radical of less than 5 carbon atoms. The ratio of the various polymer (siloxane) units in the filler is said to be critical in obtaining silicone rubber possessing the combination of optical clarity and good stress-strain properties described in the patent specification. This approach requires the use of a cogel filler produced by first preparing a cogel of $SiO_2$ units and $QSiO_{3/2}$ units and then reacting the cogel with organosilicon compounds containing $(CH_3)_2SiO$ and/or $(CH_3)_3SiO_{1/2}$ units to produce a filler with the required ratio of siloxane units.

From the foregoing discussion, it appears that there is a need for an optically clear polydiorganosiloxane composition curable to an elastomer which overcomes the above problems.

SUMMARY OF THE INVENTION

The present invention provides an optically clear polydiorganosiloxane composition containing a hydrophobic reinforcing silica filler which can be cured to form an elastomer. These compositions possess a luminous transmittance value of greater than 85% and a haze value of less than 4% per 2.54 millimeter (100 mil) thickness without the necessity for matching the refractive index of the polydiorganosiloxane with that of the silica filler. A further advantage of such compositions resides in the fact that the haze value of certain of such compositions changes very little when the composition is heated from 25° C. to 100° C. when compared with compositions wherein the optical clarity is obtained by matching the refractive index of the polydiorganosiloxane to that of the filler. Compositions of the present invention can utilize various types of polydiorganosiloxanes, especially polydimethylsiloxanes and poly-3,3,3-trifluoropropylmethylsiloxanes, provided that the polydiorganosiloxanes chosen can be cured to form optically clear compositions in the absence of silica fillers. The cured products are reinforced elastomers useful as optically clear articles. The present invention also provides a method for preparing the above compositions which employs the use of a wet or fluid filler composition.

The optical clarity is obtained through the use of a hydrophobic reinforcing silica filler consisting of surface-treated particles consisting essentially of $SiO_{4/2}$ units wherein substantially all of the particles are of such a size that when properly incorporated into the polydiorganosiloxane, they do not appreciably scatter light and hence result in optically clear compositions regardless of the refractive index of the polydiorganosiloxane employed. Furthermore, the silica filler particles are of such a shape that they result in reinforced silicone elastomers. For the purposes of the present invention, the term "silica particles" as used hereinafter is intended to include both primary silica particles and aggregates of such primary particles.

DETAILED DESCRIPTION OF THE INVENTION

This invention relates to an optically clear composition curable to an elastomer which comprises:
(A) 100 parts by weight of at least one polydiorganosiloxane consisting essentially of siloxane units selected from the group consisting of siloxane units of the unit formula

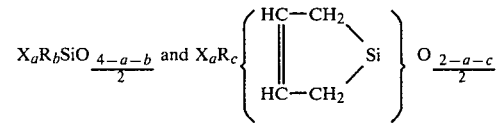

wherein each R radical is selected from the group consisting of alkyl radicals of from 1 to 6 inclusive carbon atoms, cyclohexyl radicals, phenyl radicals, halogenated alkyl radicals of from 1 to 10 inclusive carbon atoms and alkenyl radicals of from 2 to 6 inclusive carbon atoms, each X being selected from the group consisting of hydroxyl radicals, hydrogen radicals and alkoxy radicals of from 1 to 6 inclusive carbon atoms, at least 50 percent of the total amount of R radicals and

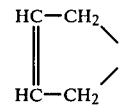

Radicals present in said polydiorganosiloxane being methyl radicals, a having a value of from 0 to 1 inclusive, b having a value of from 1 to 3 inclusive and c having a value of from 0 to 1 inclusive, the sum of a+b having a value of from 1 to 3 inclusive, the sum of a+c having a value of from 0 to 1 inclusive, the values a, b and c being such that the ratio of total R radicals and

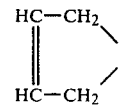

radicals to total silicon atoms present in said polydiorganosiloxane is in the range of from 1.98/1 to 2.02/1 inclusive, said polydiorganosiloxane having a viscosity of at least 0.1 pascal.seconds at 25° C., and (B) 15 to 120 parts by weight of a hydrophobic reinforcing silica filler consisting essentially of surface-treated silica particles wherein said particles consist essentially of SiO$_{4/2}$ units containing a sufficient amount of organosiloxy units chemically bonded to the surface of said particles to render the silica filler hydrophobic, said organosiloxy units being selected from the group consisting of R$_3$SiO$_{1/2}$ units, R$_2$SiO units, O$_{1/2}$R$_2$Si-O(R$_2$SiO)$_d$SiR$_2$O$_{1/2}$ units, XR$_2$SiO(R$_2$SiO)$_d$SiR$_2$O$_{1/2}$ units and mixtures thereof where each R and each X are as above defined and d has an average value of from 1 to 12 inclusive, wherein substantially all of said particles are sufficiently small in their largest dimension such that when 60 parts by weight of said filler is homogeneously mixed with 100 cubic centimeters at 23°±2° C. of a polydiorganosiloxane of the type described in (A) to form a test blend, wherein (1) the refractive index (at 25° C., sodium D line) of the polydiorganosiloxane chosen for use in said blend differs from the refractive index (at 25° C., sodium D line) of the filler by at least 0.025 units and (2) the organosiloxy units employed to render said filler hydrophobic are primarily the same as the R radicals and the

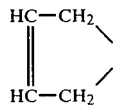

radicals present in the polydiorganosiloxane chosen for use in said test blend, then the test blend possesses a haze value of less than 4% per 2.54 millimeter thickness of said blend at 23°±2° C. according to the procedure set out in ASTM D1003-61;

wherein the mixture of (A) and (B) is an optically clear composition possessing a luminous transmittance value of at least 85% and a haze value of no greater than 4% per 2.54 millimeter thickness of said composition at 23°±2° C. according to the procedure set out in ASTM D1003-61.

This invention also relates to a composition as described above wherein the haze value of a composition consisting of a mixture of 100 cubic centimeters of (A) at 23°±2° C. and 60 grams of (B) does not increase by more than 1% per 2.54 millimeter thickness of said mixture upon heating the mixture from 23°±2° C. to 100°±5° C.

This invention also relates to a composition as described above containing at least one curing agent.

This invention additionally relates to compositions of the type described above wherein the refractive index of (A) at 25° C., sodium D line, differs from that of (B) by at least 0.025 units.

This invention further relates to an elastomer formed upon curing the above-described compositions.

This invention further relates to a method of producing optically clear compositions curable to elastomers which comprises the steps of (I) mixing the above polydiorganosiloxanes with either a wet, gelled filler composition or a wet, fluid composition containing the above hydrophobic reinforcing silica filler to form a mixture and (II) removing the volatile portion of said mixture to form an optically clear composition. This invention further relates to the above method which additionally includes the step (III) of mixing at least one curing agent into the composition.

Component (A) is at least one polydiorganosiloxane which is at least one linear or substantially linear polymer consisting essentially of a combination of the above-described siloxane units such that in the polydiorganosiloxane as a whole there is an average of from 1.98 to 2.02 inclusive R radicals and

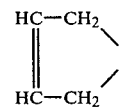

radicals attached to silicon per silicon atom. The term "consisting essentially of" is intended to mean that the above-described polydiorganosiloxanes can also contain relatively minor amounts of monoorganosiloxane and triorganosiloxane units of the unit formula RSiO$_{3/2}$ and R$_3$SiO$_{1/2}$ wherein each R is described above. Such units can be present only in minor amounts such that the average ratio of R radicals and

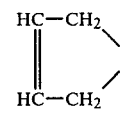

radicals to silicon atoms is from 1.98/1 to 2.02/1 inclusive. As is well known in the art, it is often advantageous to employ triorganosiloxane end-blocked polydiorganosiloxanes, such as those endblocked with trimethylsiloxy, dimethylvinylsiloxy or methylphenylvinylsiloxy units.

The polydiorganosiloxanes useful in compositions of the present invention are those which are capable of being cured to an elastomer and consist essentially of siloxane units selected from the group consisting of siloxane units of the unit formula

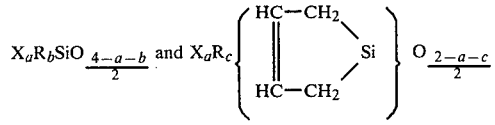

where each R can be an alkyl radical of from 1 to 6 inclusive carbon atoms such as methyl, ethyl, n-propyl, isopropyl or hexyl; cyclohexyl radicals, phenyl radicals, halogenated alkyl radicals of from 1 to 10 inclusive carbon atoms such as chloromethyl, 3chloropropyl, bromodecyl, 3,3,3-trichloro-propyl or fluoroalkyl radicals of the formula C$_t$F$_{2t+1}$CH$_2$CH$_2$ where t has a value of from 1 to 8 inclusive such as CF$_3$CH$_2$CH$_2$, C$_3$F$_7$CH$_2$CH$_2$, C$_7$F$_{15}$CH$_2$CH$_2$ and C$_8$F$_{17}$CH$_2$CH$_2$ and alkenyl radicals of from 2 to 6 inclusive carbon atoms such as vinyl, allyl, or hexenyl. Each X can be a hydroxyl radical, a hydrogen radical or an alkoxy radical of from 1 to 6 inclusive carbon atoms such as methoxy, ethoxy, propoxy, isobutoxy or hexoxy radicals. The term "consisting essentially of siloxane units" is also intended to mean that relatively minor amounts of siloxane units containing other types of organic radicals can be present in polydiorganosiloxanes useful in the present invention as long as both the optical clarity and the ability of the polydiorganosiloxanes to cure to form an elastomer has not been impaired by their presence. The values of a, b and c are described above and are such that the ratio of R radicals and

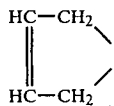

radicals to silicon atoms in the polydiorganosiloxane is as above.

Examples of siloxane units are (CH₃)₂SiO, (CF₃CH₂CH₂)(CH₃)SiO, H(CH₃)SiO,

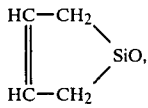

(C₂H₅)CH₃SiO, (C₂H₃)CH₃SiO, (C₆H₅)CH₃SiO, and (C₆H₅)₂SiO, among others, and endblocking units such as HO(CH₃)₂SiO₁/₂, (C₂H₃)(CH₃)₂SiO₁/₂, (CH₃)₃SiO₁/₂, (CH₃O)(CH₃)₂SiO₁/₂, (CH₃)(C₆H₅)(C₂H₃)SiO₁/₂ and

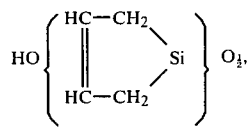

among others. The polydiorganosiloxanes can be homopolymers of the above siloxane units such as a hydroxy-endblocked polydimethylsiloxane or can consist of a combination of different siloxane units such as a copolymer of (CF₃CH₂CH₂)CH₃SiO units and (C₂H₃)CH₃SiO units or a polydiorganosiloxane consisting essentially of (CH₃)₂SiO units, (C₆H₅)CH₃SiO units and (C₂H₃)CH₃SiO units which is endblocked with (C₂H₃)(CH₃)₂SiO₁/₂ units, provided that there is an average of from 1.98 to 2.02 inclusive R radicals and

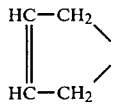

radicals per silicon atom present in the polydiorganosiloxane.

The above polydiorganosiloxanes must have a viscosity of at least 0.1 pascal.seconds (100 centipoise) at 25° C. and at least 50 percent of the total R groups in the polydiorganosiloxane should be methyl radicals to obtain an elastomeric product with reasonably good physical properties upon curing the compositions of the present invention. Preferably, the R radicals are methyl radicals, vinyl radicals, 3,3,3-trifluoropropyl radicals or combinations thereof, each X is a hydroxy radical, methoxy radical or ethoxy radical, and the polydiorganosiloxane contains no more than 5 mole percent of siloxane units containing vinyl radicals, there being no more than one vinyl radical and no more than one 3,3,3-trifluoropropyl radical per siloxane unit. More preferably, the polydiorganosiloxane contains at least two siloxane units containing vinyl radicals. Siloxane units containing phenyl radicals can be included to improve the low temperature flexibility or oxidation resistance of the cured elastomers, but are not necessary to obtain optically clear compositions. For example, cured elastomers can be prepared using polydiorganosiloxane gums which are composed of dimethylsiloxane units and at least 7 mole percent of 3,3,3-trifluoropropylmethylsiloxane units. Such elastomers are known to possess good low temperature flexibility. Cured elastomers with a high degree of solvent resistance can be obtained when polydiorganosiloxanes consisting primarily of 3,3,3-trifluoropropylmethylsiloxane units are employed. To obtain good solvent resistance, it is preferred that at least 95 mole percent of the siloxane units present contain 3,3,3-trifluoropropyl radicals, more preferably, there being no more than one such radical per siloxane unit.

To prepare low consistency compositions which can be squeezed from a tube during application, e.g., for use as sealants, it is preferable that the viscosity of the polydiorganosiloxane be low enough that it is a fluid material, preferably less than 10 pascal.seconds and more preferably less than 5 pascal.seconds at 25° C. High consistency formulations which can be used in the manufacture of eyepieces for gas masks or windshield interlayers preferably employ gums which have a viscosity of at least 10 kilopascal.seconds (10,000,000 centipoise) at 25° C. or, using another commonly accepted designation, the Williams plasticity of the gum is greater than about 50 mils (1.27 mm) at 25° C. Polydiorganosiloxanes useful in compositions of the present invention are known articles of commerce and many are commercially available. Methods for their manufacture are well known in the art as exemplified by the following U.S. Patents: Nos. 2,490,357 (Hyde), 2,542,334 (Hyde), 2,927,907 (Polmanteer), 3,002,951 (Johannson), 3,161,614 (Brown et al.), 3,186,967 (Nitzche et al.), 3,509,191 (Atwell) and 3,697,473 (Polmanteer et al.) which are hereby incorporated by reference to teach some of the types of well-known polydiorganosiloxanes which may find use in the compositions of the present invention and methods for their preparation.

The novel feature of the optically clear compositions of the present invention resides in the use of a hydrophobic reinforcing silica filler wherein substantially all of the filler particles are sufficiently small in their largest dimensions that a composition containing a hydrophobic reinforcing silica filler can be obtained which possesses the same order of magnitude of optical clarity as does the filler-free composition itself. The term hydrophobic is intended to mean that at least 70 percent and preferably all of the dry filler is visually observed to float on top of distilled water after a small amount of the filler has been added to a half-filled container of water and vigorously shaken. Hydrophobic fillers are employed to minimize or completely avoid the necessity for the use of additives such as low molecular weight hydroxyl-enblocked polydimethylsiloxane fluids to overcome the problem of crepe-aging of the composition which is believed to be due to filler-polydiorganosiloxane interactions.

The amount of filler is based upon the amount of polydiorganosiloxane present in the composition and can be present on a dry solids basis of from 15 to 120 parts by weight of filler per 100 parts by weight of polydiorganosiloxane present. Minor amounts of crosslinking compounds such as polyorganosiloxanes containing silicon hydride radicals are not included in the calculation of parts of filler. Fifteen parts of filler is about the minimum needed to obtain a useful reinforced elastomeric product while 120 parts is about the maximum which can be added. As is known to those skilled in the art, not all reinforcing silica fillers can be utilized at high filler loading levels. Some fillers with very high surface areas absorb essentially all of the polydiorganosiloxane and the use of too much filler results in a hard or crumbly, useless product. More preferably, the amount of filler utilized is in the range of from 40 to 90 parts by weight of filler per 100 parts by weight of polydiorganosiloxane.

The filler itself consists essentially of surface-treated silica particles and the term "consisting essentially of" is intended to mean that there may be a small amount of low molecular weight polysiloxanes present in the filler which are soluble in aromatic solvents such as benzene or toluene due to the manner in which the filler is prepared. As long as the amount of such low molecular weight material is on the order of a few percent or less, it will not affect the reinforcing properties of the filler. The surface-treated silica particles themselves are particles consisting essentially of a core of $SiO_{4/2}$ units and are not cogels of $QSiO_{3/2}$ and $SiO_2(SiO_{4/2})$ units such as the fillers described in U.S. Pat. No. 3,036,985 to Daudt described above. These particles are believed to form a central core of $SiO_{4/2}$ units which contains a sufficient amount of organosiloxy units chemically bonded to the surface of the core to surface-treat or form at least a monolayer at the surface of the core to result in hydrophobic filler particles. For the purposes of the present invention, the term "units" includes both the monomeric units and the polymeric groups as hereinafter illustrated. These organosiloxy units are selected from the group consisting of $R_3SiO_{1/2}$ units, $R_2SiO$ units, $O_{1/2}R_2SiO(R_2SiO)_dSiR_2O_{1/2}$ units (both ends of the polysiloxane being bonded to the surface of the silica particles), $XR_2SiO(R_2SiO)_dSiR_2O_{1/2}$ units and mixtures thereof where each R and X were previously described and d has an average value of from 1 to 12 inclusive. Examples of such units are $(CH_3)_3SiO_{1/2}$ units, $(CH_3)_2SiO$ units, $(CF_3CH_2CH_2)(CH_3)_2SiO_{1/2}$ units and $(CH_3O)(CH_3)_2SiO\{(CH_3)_2SiO\}_dSi(CH_3)_2O_{1/2}$ units.

The silica fillers useful in the present invention must possess a structure which is capable of acting as a reinforcing filler for silicone rubber as the term is generally used by those skilled in the art. It is very difficult to accurately define the silica fillers which will result in optically clear compositions in terms of the physical characteristics alone. In general, a surface-treated silica filler of the type described above which falls within the scope of each and every one of the following criteria would be expected to result in optically clear compositions. Substantially all of the silica particles of the filler should have less than 4,000 Angstroms as their largest dimension when observed under an electron microscope, i.e., the particles should be smaller than the smallest wavelength of visible light to avoid light scattering which produces haze. The filler should also have a specific surface area within the range of about 250 to 900 $m^2/g$ (measured on a dry sample by a modified B.E.T. absorption method of the type first described by Nelson et al. in *Anal. Chem.* 30, pp. 1387ff (1958)), a pore volume within the range of 0.5 to 7.0 $cm^3/g$ (pore volume can be measured as the volume of a low molecular weight, low viscosity oil which is just sufficient to completely wet out a known weight of filler or by employing the method described in ASTM C699-79), an effective refractive index within the range of about 1.42 to 1.46 at 25° C., Sodium D wavelength and a real density (not bulk density) in the range of from 1.24 to 1.95 $g/cm^3$ (real density is measured using a displacement method (such as the one set out in ASTM C699-79) which employs placing a known weight of filler in a known density and volume of a non-volatile liquid to accurately determine the actual volume occupied by the filler).

As is well known in the art, silica fillers are generally made up of primary particles or ultimate particles of very small dimensions which can be aggregated into what have been called "secondary particles" or simply "aggregates" which are made up of a number of primary particles chemically bonded to each other to form a structured silica particle which is capable of acting as a reinforcing filler for silicone rubber. It is these latter particles or aggregates which should be sufficiently small in their largest dimensions to result in the optically clear compositions of the present invention. The particle size distribution should also be such that optically clear compositions can be obtained.

On pages 462 to 510 of The Chemistry of the Silicates, John Wiley & Sons, Inc. (1979), Iler describes some of the structure of silica gels and powders, and, in particular, the analytical methods available for measuring the physical properties of such gels and powders. These pages are hereby incorporated by reference to teach these analytical methods. When observed under an electron microscope, silica filler samples which would give optically clear compositions were found to be substantially composed of particles which were, on the average, noticeably smaller in their largest dimensions than were the particles of fume silica fillers which did not give optically clear compositions. However, electron microscopy techniques were not considered to be accurate enough to be able to predict which fillers would give optically clear compositions due to the extremely small amount of filler which can be observed under high magnification and due to the fact that one cannot be certain that the tiny sample observed is representative of the entire filler. However, the above filler measurements are useful as guidelines in selecting fillers for use in optically clear compositions.

The simplest and most practical method for determining whether or not a hydrophobic reinforcing silica filler is useful in the compositions of the present invention is to measure the haze value and the luminous transmittance value of a 2.54 millimeter (mm) thickness of the homogeneously blended composition. Preferably the measurements are made on a sample pressed between two sheets of clean glass to insure that a uniform thickness of the composition is being used during the measurement process and to eliminate optical distortions due to imperfections in the molded surfaces. Hydrophobic reinforcing silica fillers possessing the requisite filler particle size and particle size distribution will result in compositions having haze values of less than 4% per 2.54 mm thickness and luminous transmittance values of at least 85% per 2.54 mm thickness when the filler is homogeneously blended with the polydiorganosiloxane(s) chosen. Use of the above measurements to select fillers avoids the above-described lack of accuracy which is inherent in use of an electron microscopic technique to identify potentially useful fillers. The procedure followed to obtain the above values is set out in ASTM D1003-61. The instrument used to obtain the values reported in the following Examples 1-24 was a Gardner Pivotable Sphere Hazemeter (Model HG 1024) equipped with a Model PG 5500 Digital Photometer (Gardner Laboratory, Bethesda, MD 20014). CIE Source A, sometimes called Illuminant A, was used in measuring the above values. In Examples 25-30, a Hunterlab Model D55H Hazemeter (Hunter Associates Laboratory, Inc., Reston, VA 22090) which employed CIE Source C, sometimes called Illuminant C, was used to obtain the haze and luminous transmittance reported therein.

Another test which is useful in identifying silica fillers having the required and particularly preferred filler particle dimensions involves preparing a homogeneously blended mixture of 100 cubic centimeters (cc, measured at 23°±2° C.) of the polydiorganosiloxane, and more preferably, of a high molecular weight polydiorganosiloxane gum, or mixtures of two or more thereof, chosen and 60 grams of the hydrophobic reinforcing silica filler to be evaluated. The haze value of a uniform 2.54 mm thickness of this mixture should not increase by more than 1 percent upon heating the mixture from 23°±2° C. to 100°±5° C., i.e., if the measured haze value of a 2.54 mm thickness of a mixture is 3.0% at 23°±2° C., then at 100°±5° C., the measured haze value of the same 2.54 mm thickness must not be more than 4.0%. The immediately preceding sentence defines the meaning of the term "does not increase by more than 1% per 2.54 mm thickness of said mixture upon heating the mixture from 23°±2° C. to 100°±5° C." as that term is used in this specification and in the appended claims. The refractive index of a polydiorganosiloxane is known to change upon heating. Therefore, if the optical clarity of the mixture results from the prior art technique of refractive index matching, for example when phenyl radicals are employed for the purpose of adjusting the refractive index of the polydiorganosiloxane to that of the silica filler, the haze value of the mixture at 100°±5° C. will be larger than that of the same composition at 23°±2° C. due to the increased difference between the refractive index of the phenyl-containing polydiorganosiloxane and the silica filler at the higher temperature. Compositions of the present invention do not rely upon refractive index matching to obtain optical clarity because of the particular type of silica filler that is required for use in such compositions. Even if a composition, for example, one containing a phenyl-containing polydiorganosiloxane, possesses the above haze and luminous transmittance values for a 2.54 mm thickness, but increases in haze value by more than 1% per 2.54 mm thickness upon heating the composition from 23°±2° C. to 100°±5° C., the following procedure can be used to discover whether or not the filler present in the composition falls within the scope of the compositions of the present invention.

The hydrophobic reinforcing silica filler useful in the compositions of the present invention can be differentiated from others which have a larger overall particle size and require refractive index matching of the filler with the polymer to obtain optically clear compositions simply by measuring the refractive index of the filler and combining that filler with a polydiorganosiloxane having a refractive index which differs from that of the filler by at least 0.025 units to form a test blend. For example, a composition containing a hydrophobic, reinforcing silica filler of a sufficiently small particle size (a refractive index about 1.428) would be expected to possess a haze value of less than 4 percent per 2.54 mm thickness when it is combined with a polydimethylsiloxane gum having a refractive index of about 1.403, especially when 60 grams or more of such a filler is combined with 100 cc of polydiorganosiloxane as described above. As will be described further, infra, the organic radicals present in the polydiorganosiloxane employed in the test blend should be primarily the same as the organic radicals present in the organosiloxy units employed to render the silica filler to be tested hydrophobic.

In our previous U.S. patent application Ser. No. 156,003, filed June 3, 1980, the term "optically clear" was intended to mean that the claimed compositions possessed a luminous transmittance value of at least 85%, a haze value of no greater than 4 percent and the haze value of a homogeneously blended mixture consisting of 60 grams of filler and 100 cc of either one polydiorganosiloxane or mixtures of two or more thereof, did not increase in haze value by more than 1 percent upon heating the mixture from 23°±2° C. to 100°±5° C., all values being based upon a uniform 2.54 mm thickness of the composition. As will be noted, infra, the compositions should be within the first two haze and luminous transmittance value limitations when curing agents and, if any are used, other additives are present in the composition. Heating may cause compositions containing curing agents to cure, so the last measurement which involves heating the mixture is preferably made in the absence of a curing agent.

The present application, which is a continuation-in-part of said U.S. Ser. No. 156,003, was filed as a result of work done subsequent to the filing of that application. That work showed that the above definition of "optically clear" was unduly restrictive because certain novel compositions were prepared which satisfied the first two requirements of that definition even though the refractive index of the polydiorganosiloxane was not matched with that of the filler, but which sometimes failed to satisfy the third heating test. This was especially true for compositions that were made up of low molecular weight polydimethylsiloxanes that were fluids at room temperature and that were curable to elastomers. It is possible that the failure to satisfy the third heating test is due to the difficulty of adequately dispersing the agglomerated (held together by physical forces rather than chemical bonds) filler particles into the lower molecular weight polydiorganosiloxanes. As noted above, the silica filler particles useful in compositions of the present invention are in the form of aggregates (held together by chemical bonds rather than physical forces) which have a particular particle size, particle size distribution and structure which enables a composition that is curable to a reinforced silicone elastomer having certain optical properties to be produced. The following explanation is being made for the purpose of enabling others to more fully practice the present invention and is not intended to limit the scope of the invention. For the purposes of this explanation, the silica filler aggregates and agglomerates will be assumed to approximate spherical particles. The equation for the intensity of scattered light by spherical particles suspended in a medium is:

$$I = \left(\frac{8\pi^4 A^6 N}{D^2 \lambda^4}\right)\left(\frac{(m^2-1)^2}{(m^2+2)^2}\right)(1+\cos^2\theta)I_o$$

where
I = intensity of the scattered light
A = radius of scatterer
N = number of particles
D = distance for observation I
λ = wavelength of the light
$I_o$ = intensity of the incident light
m = R.I. (Scattering Particles) ÷ R.I. (Medium)
R.I. = refractive index at 25° C., sodium D wavelength
θ = angle at which the measurement of I is made Silica fillers are not spherical particles and the dimensions of the particles are not uniform, nevertheless this equation does provide a valid, although simplistic, model of the silica filled compositions. Haze, or more specifically the haze value, as measured by the method described in this Application, is a measurement of scattered light. As is shown by the above equation, the variables which are dependent upon the filler and polydiorganosiloxane present in the composition and which thereby affect the optical clarity of the composition are $A^6$, N, and m (compositional variables). All other variables in the above equation are defined by the method of measurement employed. Thus, the haze value of a composition is also a function of the compositional variables $A^6$, N, and m. N is defined by the equation $(w/\rho)/V$ where w is the weight of the scattering particles present in the composition, $\rho$ is the density of the scattering particles, and V is the volume of a single particle. The weight and density are constants for the specific composition being considered; therefore N reduces to a constant divided by $A^3$ due to the relationship between the diameter and volume of a spherical particle. Therefore in the compositional variables in the first term of the above equation, the $A^6 N$ term reduces to a constant multiplied by $A^3$. When the refractive index of the polydiorganosiloxane and filler are matched, m is equal to unity, $(m^2 - m^1)^2$ is equal to zero, and in theory the haze value of the composition is zero. In practice, the haze value does not go to zero due to the presence of foreign material both within the composition and on the surface of the test specimen and also due to the impossibility of precisely matching the refractive index of the silica filler and the polydiorganosiloxane. The prior art method of obtaining optically clear silicone elastomer compositions by refractive index matching technique requires that the refractive index of the polydiorganosiloxane and silica filler be nearly identical. Differences of as little as 0.01 units in refractive index values, and especially when the difference is more than 0.025 units, result in sufficient haze that the composition is not optically clear. When the common methods of treating silica fillers using organosilicon hydrophobing compounds which would generate $R_3SiO_{1/2}$ or $R_2SiO$ moieties are employed, the refractive index of such a treated silica filler is in the range of 1.42–1.46—the specific value being a function of the R radical used. For example, when all of the R radicals present in the moieties (organosiloxy units) employed to treat the silica filler are methyl (Me) radicals—some of the most common and economical organosilicon hydrophobing compounds provide such moieties—the refractive index of such a treated filler is typically 1.43 for both the silica fillers used in the prior art and the silica fillers used in the compositions of this invention. To obtain optically clear silicone elastomer compositions using such a treated filler by the prior art method of refractive index matching, polydiorganosiloxanes having a refractive index of 1.43±approximately 0.01 generally had to be used. Therefore siloxanes such as polydimethylsiloxane (RI=1.403) or poly(trifluoropropyl)methylsiloxane (RI=1.380) could not be used to obtain optically clear compositions possessing the haze and luminous transmittance values described herein by the prior art refractive index matching methods. Instead, the prior art required that special polydiorganosiloxanes which are generally copolymers containing a sufficient amount of phenyl-containing siloxane units such that the refractive index of the polydiorganosiloxane is approximately 1.43 (to match the refractive index of the silica filler) must be used.

As shown by the following examples and in accordance with the teachings of the present invention, the refractive index of the polydiorganosiloxane and filler do not have to be closely matched in order to obtain optically clear compositions which are curable to silicone elastomers. For example, silica fillers which are useful in the compositions of this invention generally have a RI of 1.43 when the filler is treated with organosilicon hydrophobing compounds such as $Me_3SiO_{1/2}$ or $Me_2SiO$ moieties, but as demonstrated by Examples 1–4, such fillers can be combined with a polydimethylsiloxane gum having a RI of 1.403 to obtain optically clear compositions. The reason the compositions of this invention are optically clear even without closely matching the refractive index of the polydiorganosiloxane to that of the filler is believed to be because the effective particle size of the silica filler (A in the previously cited equation) is small when compared to the silica fillers used in the prior art refractive index matching methods. The effective particle size refers to the size of the aggregates or undispersed agglomerates. Thus, in the previously cited equation, the first term is significantly smaller than when silica fillers of the type used in the prior art are employed. Since the haze value observed is the product of the first term and the second term, reduction in the magnitude of the first term to a very small number results in a reduction in haze value. Alternatively stated, because of the small particle size, and consequently a small first term (in the equation), a mismatch in the refractive index of the polydiorganosiloxane and filler can be tolerated in the compositions of the present invention without serious deleterious effects upon optical clarity. The second term which involves the refractive index terms makes a contribution to the haze value observed, even in the compositions of this invention. However, because of the smaller particle size of the particular silica fillers used in the compositions of this invention, a broad range of polydiorganosiloxanes can be utilized because optical clarity is not as critically independent upon the refractive index of the polydiorganosiloxane and the silica filler as it is in prior art optically clear compositions which rely on a refractive index matching technique.

It is well known that in order for hydrophobic silica fillers to act as reinforcing silica fillers for silicone elastomers, it is necessary for the filler to be structured. Structure refers to the aggregation of the primary silica particles to form chemically combined clusters or aggregates. It was therefore unexpected that certain hydrophobic silica fillers would possess the necessary structure to act as reinforcing silica fillers, yet be of sufficiently small particle size that optically clear compositions could be prepared using polydiorganosiloxanes which had a refractive index value which was significantly different from that of the silica filler.

The equation for light scattering previously cited assumes that all the particles are the same size. In fact, there would be a distribution of particle sizes in the silica fillers. The total amount of scattered light (i.e., haze value observed) would be obtained by summing the contributions of the various particle sizes over the entire distribution of particle sizes. Not only the average particle size but also the particle size distribution determines the extent to which light passing through the sample will be scattered and thus appear as haze. Large particles will scatter light more than small particles even when equal weights (and consequently more of the smaller particles) of the fillers are compared. Examination of the compositions of the present invention by electron microscopy indicated that the largest aggregate dimensions are approximately 1000 Angstrom whereas compositions of the type used in the prior art refractive index matching method (where a commercially available fume silica was employed) were observed to contain a significant number of silica filler aggregates having their largest dimensions in the 3000 to 4000 Angstrom range. However, as previously noted, electron microscopy does not allow sampling of a sufficiently large number of particles to provide an accurate representation of the particle size distribution for the purposes of reproducibly defining the silica fillers useful in the compositions of the present invention. It is hoped that the above explanation will aid others to better understand and practice the present invention.

As previously mentioned, in order for a silica filler to be reinforcing it is necessary for the primary silica particles to be aggregated. Such aggregates of primary particles are held together by strong chemical bonds and consequently are not normally broken apart during compounding of the silica filler with polydiorganosiloxane. The aggregates further associated via physical forces to form agglomerates which can be dispersed during compounding.

Because the agglomerates are composed of aggregates that are physically associated rather than chemically bonded to each other, it is believed that the agglomerates can be broken down into the smaller aggregates by employing well-known mechanical mixing means such as a two- or a three-roll mill which can produce high shear mixing conditions. The filler is blended with the polydiorganosiloxane under high shear conditions until the agglomerates have been disassociated into their constituent aggregates and which have been uniformly dispersed in the polydiorganosiloxane to provide optimum optical clarity. Another method for dispersing the filler particles so as to obtain maximum optical clarity is to employ the well-known technique of master batch mixing whereby the filler is slowly added to an amount of polydiorganosiloxane that is less than the full amount of the latter that is called for in the formulation under high shear mixing conditions. Because there is more filler present during the mixing process, the particles are subjected to higher shearing forces and are thus more completely mixed into the polydiorganosiloxane; therefore, the total amount of agglomerates present is minimized. Upon reaching the desired degree of dispersion, the remainder of the polydiorganosiloxane required by the formulation is added to result in a composition possessing the desired filler loading level and optimum optical clarity.

The latter mixing method appears to be particularly advantageous where the polydiorganosiloxanes employed are fluids at room temperature and a haze value of more than 4% per 2.54 mm thickness at 23°±2° C. is obtained because such lower molecular weight polydiorganosiloxane fluids do not allow as much shearing force to be exerted on the filler as does a high molecular weight polydiorganosiloxane gum. One test that can be employed to discover whether or not a silica filler is being adequately or homogeneously dispersed in a polydiorganosiloxane fluid is to disperse the same filler in a polydiorganosiloxane gum having the same type and ratio of siloxane units as does the fluid at the same filler loading level as in the formulation containing the fluid polydiorganosiloxane. If lower haze values are obtained with the gum formulation, then the silica filler is probably not homogeneously dispersed in the fluid polydiorganosiloxane and additional mixing under high shear conditions should be employed to obtain improved haze values as long as further mixing under such conditions does not degrade the polydiorganosiloxane.

For the above reasons, the definition of "optically clear" as used in present specification and appended claims has been broadened to include compositions of the type described above which possess a luminous transmittance value of at least 85% and a haze value of no greater than 4% per 2.54 mm thickness at 23°±2° C. according to the procedure set out in ASTM D1003-61, both values being based upon a uniform 2.54 mm thickness of the mixture. To the best of our knowledge, silica filler reinforced polydiorganosiloxane compositions of the type described above that are curable to elastomers, particularly those wherein the R radicals present in the polydiorganosiloxanes are limited to methyl, vinyl and 3,3,3-trifluoropropyl radicals, have not been prepared in a reproducible manner which possess the above luminous transmittance and haze values without the use of refractive index matching techniques. A more preferred embodiment of the optically clear compositions of the present invention are the above described compositions wherein the haze value of a homogeneously blended mixture consisting of 60 grams of the above-described silica filler and 100 cc of either one polydiorganosiloxane of the type described above or mixtures of two or more thereof wherein the mixture does not increase in haze value by more than 1% per 2.54 mm thickness of the mixture upon heating the mixture from 23°±2° C. to 100°±5° C.

The silica fillers must be reinforcing fillers as the term is generally recognized in the art. It is well known that many types of filler can be used to reinforce silicone rubber, for example, increase the tensile strength, when the filler is present in a sufficiently large amount even when the filler does not possess the necessary structure to act as an efficient reinforcing agent. This is a wasteful use of filler and even though the cured elastomer may possess a tensile strength in excess of 6.2 megapascals (900 p.s.i.), tear strength or durometer values may be very low. This invention is directed towards compositions containing a hydrophobic reinforcing silica filler which will result in a useful cured silicone elastomer with a good balance of physical properties and a reasonable amount of filler.

For the purposes of the present invention, a hydrophobic silica filler is considered to be a hydrophobic reinforcing silica filler for silicone rubber if the tensile strength at break of a vulcanized silicone rubber consisting of a cross-linked polydimethylsiloxane gum and the silica filler to be evaluated is at least 6.2 MPa (900 p.s.i.). Such an evaluation can be carried out by using a formulation composed of a mixture of 100 parts by weight of a dimethylvinylsiloxy-endblocked polydiorganosiloxane gum consisting essentially of 99.86 mole percent of dimethylsiloxane units and 0.14 mole percent of methylvinyl-siloxane units based upon the total moles of diorganosiloxane units present (it being understood that a minor amount of other types of units such as $SiO_{4/2}$ and $CH_3SiO_{3/2}$ may be present as a result of impurities introduced during the manufacture of such a gum) wherein the polymer has a Williams plasticity (4.2 gram sample) in the range of about 55–65 mils (1.40–1.65 millimeters), 60 parts by weight of the filler to be evaluated (non-volatile filler solids) and 1 part by weight of 2,5-dimethyl-2,5-di-(t-butylperoxy)hexane catalyst. This formulation is allowed to stand overnight at room temperature after mixing, re-milled on a two-roll mill to soften the stock and heat/press cured in a molding chase for 10 minutes at about 170°–175° C. The tensile strength exhibited by such cured elastomer stocks, measured according to ASTM D412, should be at least 6.2 MPa (900 p.s.i.). When fillers which have been rendered hydrophobic with organosilicon hydrophobing compounds containing fluorinated alkyl radicals are to be evaluated, it is preferable to employ the above procedure using 45 parts of non-volatile filler solids and to substitute a fluorine-containing polydiorganosiloxane gum having the composition described as Gum C, infra, having a Williams plasticity in the range of 90–125 mils (2.29–3.18 mm) for the above polydiorganosiloxane gum.

The best method presently known to the applicants for producing such a filler is by the alkaline hydrolysis of an alkyl silicate such as methyl orthosilicate, Si-$(OCH_3)_4$; ethyl orthosilicate, $Si(OC_2H_5)_4$; methyl polysilicate or ethyl polysilicate, preferably, the latter two alkyl silicates have an average molecular weight of less than 1000 g/mole. More preferably, the alkyl silicate is methyl orthosilicate. The hydrolysis is conducted under alkaline conditions in the presence of at least 70% of one-half of the stoichiometric amount of water necessary to completely hydrolyze the theoretical amount of alkoxy groups present in the alkyl silicate chosen. To insure solubility of the alkyl silicate and to aid in the formation of a silica filler having the proper structure and particle size, at least one water miscible lower aliphatic alcohol such as a methanol, ethanol, n-propanol and isopropanol can be present during the hydrolysis of the alkyl silicate. Alcohol is also formed during the hydrolysis of the alkyl silicate and aids in the initial solubilization of the alkyl silicate thereby promoting the rapid hydrolysis and condensation of the alkyl silicate into a silica filler having the desired particle size. Preferably, at least 50 percent by weight of the total amount of alcohol (the sum of the alcohol added and that generated by hydrolysis) and water present in a hydrolysis mixture consisting of alkyl silicate, water, alcohol and basic catalyst used to render the mixture alkaline be alcohol. The preferred alcohol is methanol.

The hydrolysis and condensation of alkyl silicate is known to proceed according to the following general equation

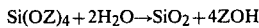

$$Si(OZ)_4 + 2H_2O \rightarrow SiO_2 + 4ZOH$$

where Z is a methyl group in the case of methyl orthosilicate or methyl polysilicate and Z is an ethyl group in the case of ethyl orthosilicate or ethyl polysilicate. Therefore in the total reaction, one-half mole of water per alkoxy or —OZ group in the alkyl silicate (100% of the theoretical or stoichiometric amount) is required to completely hydrolyze the alkyl silicate to form a hydrolyzed adduct which then condenses into the corresponding theoretical $SiO_{4/2}$ or silicon dioxide units. It will be assumed that the alkyl silicate is completely hydrolyzed and condensed although it is well known that the actual structure of the silica filler core is not entirely made up of $SiO_{4/2}$ units because some of the silicon atoms have hydroxyl and alkoxy radicals remaining after the hydrolysis and condensation reaction is completed. The actual amount of hydroxyl and alkoxy radicals remaining in the product is dependent upon several variables such as the amount of water, alcohol and/or catalyst initially present and also upon the theoretical $SiO_2$ content of the hydrolysis mixture. For this reason, about 70% of one-half of the theoretical or stoichiometric amount of water necessary to completely hydrolyze the alkoxy groups on the alkyl silicate is the minimum amount that can be used to produce silica fillers according to this method. It can be preferable to use approximately 100% of one-half of the stoichiometric amount of water because the resulting silica filler-containing compositions are substantially free of water and as a result, there is one less component to be separated during the re-cycling of the volatile liquid by-products. However, satisfactory hydrophobic reinforcing silica fillers can also be produced by the above method when greater than 120% of one-half of the stoichiometric amount of water is present in the mixture.

The amount of alkyl silicate employed should be sufficient to provide at least 3 parts by weight of theoretical $SiO_{4/2}$ units per 100 parts by weight of the total amount of alkyl silicate, water, alcohol and basic catalyst present in the formulation to obtain a commercially practical amount of filler and the maximum amount is governed by the theoretical maximum which is about 32 parts by weight of theoretical $SiO_{4/2}$ units in the case of methyl orthosilicate. Because the hydrolysis reaction is exothermic and becomes more difficult to control above 20 parts of theoretical $SiO_{4/2}$ units, a preferred range is from 3 to 20 inclusive parts and more preferably, in the range of from 8 to 17 inclusive parts of theoretical $SiO_{4/2}$ units per 100 parts of the above total.

The organosiloxy units employed to render the surface of the silica filler hydrophobic are derived from organosilicon hydrophobing compounds such as organosilanes, organosilazanes, low molecular weight diorganopoysiloxanes and diorganopolysilazanes which will not render the reaction mixture acidic. Suitable organosilicon hydrophobing compounds can be those possessing the average formula $R_nSiY_{4-n}$, $(R_3Si)_2NH$, $(R_3Si)_2O$, $(R_2SiO)_e$, $(R_2SiNH)_e$, $R'O(R_2SiO)_dR'$, $(R_3Si)_2NR''$ and $(R_2SiNR'')_e$ and mixtures thereof. Each $R'$ can be hydrogen or $R''$. Each $R''$ can be an alkyl radical of from 1 to 4 inclusive carbon atoms such as methyl, ethyl, propyl, isopropyl, butyl or isobutyl. Each Y can be —OH, —OR such as methoxy or butoxy, —NHR'' such as —NHCH$_3$ or —NHCH$_2$CH$_3$, or —NR''$_2$ such as —N(CH$_3$)$_2$ or —N(C$_2$H$_5$)$_2$. The average value of n is from 2 to 3 inclusive, R and d are as above and e has an average value of from 3 to 6 inclusive.

The amount of organosilicon hydrophobing compound which is useful in rendering the silica filler hydrophobic can be calculated on the basis of moles of hydrophobe agent per mole of theoretical $SiO_{4/2}$ units present in the filler and must be employed in sufficient amounts to render the silica filler hydrophobic. Generally, at least 0.05 moles of organosilicon hydrophobing compound per mole of $SiO_{4/2}$ units is required. More preferably, in the case of organosilicon hydrophobing compounds of the average formula $(R_2SiO)_e$, $(R_2SiNH)_e$, $R_nSiY_{4-n}$ where n has an average value of 2, $(R_2SiNR'')_e$ and $R'O(R_2SiO)_dR'$, a range of from 0.05 to 0.5 moles of organosilicon hydrophobing compounds per mole of $SiO_{4/2}$ units is generally sufficient. In the case of organosilicon hydrophobing compounds of the average formula $(R_3Si)_2NH$, $(R_3Si)_2O$ and $(R_3Si)_2NR''$, a range of from 0.08 to 0.5 moles of organosilicon hydrophobing compounds per mole of theoretical $SiO_{4/2}$ units is generally sufficient. In the case of organosilicon hydrophobing compounds of the average formula $R_nSiZ_{4-n}$ where n has an average value of 3, a range of about 0.15 to 1.0 moles of hydrophobe agent per mole of theoretical $SiO_2$ units is generally sufficient. For example, one mole of hexamethyldisilazane is considered to be one mole of hydrophobe agent for the purposes of this calculation, but it is recognized that this compound provides two moles of organosiloxy units (trimethylsiloxy units) per mole of hexamethyldisilazane.

Examples of suitable organosilicon hydrophobing compounds are organosilanes such as dimethyldimethoxysilane, methylethyldimethoxysilane, methylvinyldimethoxysilane, 3,3,3-trifluoropropylmethyldimethoxysilane, trimethylmethoxysilane, trimethylsilanol, dimethylphenylmethoxysilane, dimethylpropylmethoxysilane, dimethylphenylpropoxysilane, $(CH_3)_3SiNH_2$, $(CH_3)_3SiNHCH_3$, $(CH_3)_2Si(NHCH_3)_2$, $(CH_3)_3SiN(CH_3)_2$, sym-tetramethyldivinyldisilazane, sym-tetramethyl-bis-3,3,3-trifluoropropyldisilazane, sym-tetramethyldiphenyldisilazane, sym-tetramethyldivinyldisiloxane, and hexamethyldisiloxane; cyclic polyorganosiloxanes such as 1,3,5-trimethyl-1,3,5-trivinylcyclotrisiloxane, octamethylcyclotetrasiloxane, hexamethylcyclotrisiloxane, 1,3,5-trimethyl-1,3,5-tris(3,3,3-trifluoropropyl)cyclotrisiloxane, hexamethylcyclotrisilazane and octamethylcyclotetrasilazane and linear polydiorganosiloxanes such as a mixture of methoxy-endblocked polydimethylsiloxanes of the average general formula $CH_3O\{(CH_3)_2SiO\}_dCH_3$ where d has an average value of from 5-7 wherein the mixture is formed by adding a basic catalyst to a methanol solution of hexamethylcyclotrisiloxane, and linear polydimethylsiloxanes such as $HO\{(CH_3)_2SiO\}_dOH$. Mixtures of different organosilicon hydrophobing compounds can also be used. Preferred among the organosilicon hydrophobing compounds are one or more compounds having the average unit formula $\{(CH_3)_3Si\}_2NH$, $\{(CH_3)_2(CF_3CH_2CH_2)Si\}_2NH$, $\{(CH_3)R'''SiO\}_e$, $CH_3O\{(CH_3)R'''SiO\}_dR''''$ and $(CH_3)R'''Si(OR'')_2$ wherein each $R'''$ is a methyl radical, a 3,3,3-trifluoropropyl radical or a vinyl radical, each $R''''$ is hydrogen or a methyl radical and the average value of e is about 3. To obtain optimum optical clarity, it is preferred that the R and $R'''$ radicals present in the organosiloxy units employed to render the filler hydrophobic be primarily the same as the R radicals found in the polydiorganosiloxanes with which the fillers are mixed. The term "primarily" is intended to mean that minor amounts of the organosiloxy units present on the filler can possess radicals which are not contained in the polydiorganosiloxanes employed while major amounts of such units do contain radicals which correspond with the radicals found in the polydiorganosiloxane. For example, when these fillers are to be used in compositions containing fluorinated polydiorganosiloxanes such as a poly(3,3,3-trifluoropropyl)methylsiloxane gum, it is preferable to use major amounts of fluorine-containing organosilicon hydrophobing compounds such as $\{(CH_3)_2(CF_3CH_2CH_2)Si\}_2NH$ and minor amounts of compounds which do not contain fluorinated radicals such $(CH_3)(C_2H_3)Si(OCH_3)_2$ to render the filler hydrophobic to insure that the polydiorganosiloxane and the surface-treated silica filler form compatible mixtures. When organosilicon hydrophobing agents such as hexamethyldisiloxane are employed which require hydrolysis to liberate a reactive species such as $(CH_3)_3SiOH$ and, as in the case of hexamethyldisilazane, to liberate a volatile base, there should be a sufficient amount of water present to hydrolyze such compounds in addition to the amount of water required to hydrolyze the alkyl silicate.

Basic catalysts which are suitable for use in the present invention are those compounds which are capable of rendering the mixture alkaline. Examples of such catalysts are inorganic compounds such as ammonia, ammonium hydroxide, ammonium carbonate, sodium hydroxide, and lithium hydroxide, organic compounds such as amines such as ethylamine, dimethylamine, diethylamine, triethylamine, and N,N-dimethylethanolamine, or alkali salts of carboxylic acids such as sodium acetate, ammonium acetate and sodium formate. Also useful as suitable basic catalysts are the organosilazane compounds suggested above as being useful as organosilicon hydrophobing compounds. Thus, a sufficient amount of a compound such as hexamethyldisilazane can serve as both a basic catalyst and as an organosilicon hydrophobing compound. It is preferable to use volatile basic compounds such as ammonia, ammonium hydroxide, and/or compounds which generate volatile bases such as hexamethyldisilazane to avoid introducing undesirable ionic salts into the silica filler-containing composition. Strong bases such as sodium hydroxide can effect the structure of the silica and render silica filler produced in this manner non-reinforcing. It is believed that the presence of alcohols retards this effect, but it is preferable to avoid the use of such strongly basic compounds. There should be a sufficient amount of at least one basic catalyst present to result in a silica filler-containing composition with a pH of greater than 7. Typically, the pH is in the range of about 9 to 12.5.

The preferred method for producing silica fillers useful in the present invention using alkaline hydrolysis of an alkyl silicate involves mixing the water, alcohol and any basic catalyst not provided by the organosilicon hydrophobing compound together with stirring. The organo-silicon hydrophobing compound (or compounds) is then added and allowed to stir for a short time. The alkyl silicate is then rapidly added to the stirring mixture to form a silica filler-containing composition. After the addition of the last ingredient, the composition is allowed to age for a sufficient amount of time until a sample of the filler obtained by drying a sample of the above composition is considered to be hydrophobic. Generally, the composition is aged between thirty minutes and twenty-four hours and preferably between thirty minutes and four hours prior to use. Longer periods of aging do not appear to be detrimental to the optical clarity of elastomers prepared from the filler compositions provided that the filler composition is not allowed to become dry prior to the elastomer preparation.

Alternatively, the organosilicon hydrophobing compound(s) can be mixed together with the alkyl silicate to form a solution and that solution can be rapidly added to the remaining ingredients as described above to form a hydrophobic reinforcing silica filler-containing composition which is then aged as above. This method of mixing is preferred when the organosilicon hydrophobing compound is the sole source of basic catalyst.

The mixing and aging steps in both methods can be carried out at room temperature or at temperature up to the boiling point of the volatile portion of the composition. Preferably, the mixing and aging steps take place at room temperature. These fillers will generally contain up to about 3 percent by weight of alkoxy groups, methoxy groups in the case of methyl orthosilicate, based upon the total weight of filler.

During the aging step, the composition may gel. However, the silica filler-containing composition itself need not be in the form of a wet, gelled filler composition. It was found that if a stirring means which possessed a sufficient amount of torque to break up gel particles as they were formed, such as a gear-driven mechanical stirrer, was employed both during the addition of the alkyl silicate and thereafter, the resulting composition remained in a fluid, pourable state for a sufficient amount of time to enable the composition to be pumped through pipes to the site where it was to be incorporated into the polydiorganosiloxane even though in the absence of such stirring means, the same formulation would result in a wet, gelled filler composition. Either the wet, gelled filler compositions or the wet, fluid filler compositions can be compounded with the polydiorganosiloxanes as hereinafter described. The term "wet" is intended to mean a gel in the form of a hydrogel or an organogel. The volatile portion of the composition can be replaced by another liquid such as toluene as long as the process used to replace the volatile portion does not cause the filler particles to agglomerate and result in a filler which will not form optically clear compositions. Typically, the actual non-volatile solids content of the gelled or fluid hydrophobic reinforcing silica filler-containing compositions is in the range of from 5 to 35 percent by weight.

Further details concerning the methods of formulating, processing and incorporating hydrophobic reinforcing silica fillers of this type into polydiorganosiloxanes can be found in U.S. patent application Ser. No. 156,002 entitled "Method for Producing Hydrophobic Reinforcing Silica Fillers and Fillers Obtained Thereby" to Michael A. Lutz which was filed on June 3, 1980, is assigned to the same assignee as is the present invention, and is hereby incorporated by reference to teach such methods.

In addition to the above filler preparation method, any method which will render the silica filler hydrophobic prior to the time when substantially all of the filler particles have aggregated to a particle size which is smaller than about 4,000 Angstroms and which method results in a hydrophobic reinforcing silica filler possessing the above-described physical characteristics can be used to prepare fillers which may find use in optically clear compositions of the present invention having the above-described haze and luminous transmittance values.

The filler and one or more polydiorganosiloxanes can be mixed together using mixing apparatus and techniques which are well known in the art such as bread dough mixers, twin-screw mixers, two-roll mills and the like. The mixing should be as homogeneous as possible to obtain optimum optical clarity. It is very important to operate under conditions which are as free from contamination by foreign materials as possible because dirt and lint seriously increase haze values and decrease luminous transmittance values. It is best to add the silica filler to the polydiorganosiloxane as a wet composition rather than as a dry powder, especially when the silica filler is obtained by the alkaline hydrolysis of an alkyl silicate, particularly methyl orthosilicate. Wet compounding minimizes the formation of large agglomerates that may be difficult to properly disperse into particles which are sufficiently small (primary particles and aggregates thereof) to result in optically clear compositions.

Once the filler and polydiorganosiloxane have been mixed, various well-known means such as heating the mixture to 105°–110° C. as the mixing operation is continued or heating the mixture under reduced pressure while mixing is continued can be employed to remove the volatile portion of the mixture. It is desirable that the filler be homogeneously mixed with the polydiorganosiloxane prior to removing the volatile portion of the mixture.

Therefore, one preferred method for producing optically clear compositions of the present invention comprises the steps of (I) mixing 100 parts by weight of at least one polydiorganosiloxane as defined above with a sufficient amount of a wet, gelled filler composition containing from 15 to 120 parts by weight of a hydrophobic reinforcing silica filler as defined above to form a mixture and (II) removing the volatile portion of said mixture to obtain an optically clear composition curable to an elastomer.

An alternative preferred method for producing optically clear compositions of the present invention comprises the steps of (I) mixing 100 parts by weight of at least one polydiorganosiloxane as defined above with a sufficient amount of a wet, fluid filler composition containing a hydrophobic reinforcing silica filler as defined above to form a mixture and (II) removing the volatile portion of said mixture to obtain an optically clear composition curable to an elastomer. Both methods can additionally comprise a third step (III) of mixing at least one curing agent into the composition.

Once the filler and polydiorganosiloxane have been homogeneously blended and any volatiles are removed to form an optically clear composition, the composition can be cured to form an optically clear elastomer. The terms "cured" and "curing" as used in describing the present invention include any method which can be used to vulcanize or cross-link the polydiorganosiloxanes present in the composition to form optically clear, useful elastomeric products. It is well within the ability of one skilled in the art to select one or more polydiorganosiloxanes which, when mixed with the above-described silica fillers, can be cured to form optically clear elastomeric products by such means as electron beam irradiation or ultraviolet light. The compositions can additionally contain one or more curing agents which aid in forming cured elastomeric products possessing the desired haze and luminous transmittance values. Examples of curing agents are organic peroxides which are suitable for vulcanizing silicone rubber such as benzoyl peroxide, tertiarybutyl perbenzoate, 2,4-dichlorobenzoyl peroxide, dicumyl peroxide, ditertiarybutyl peroxide, 2,5-bis(t-butylperoxy)-2,5-dimethylhexane and the like or curing agents which promote the room temperature vulcanization of polydiorganosiloxanes upon exposure to moisture such as the combination of (a) metal salts of carboxylic acids such as stannous octoate with (b) a relatively minor amount of an alkyltrialkoxysilane or ethyl orthosilicate where the polydiorganosiloxane comprising 100 parts by weight of the mixture is a hydroxy-endblocked polydiorganosiloxane. Other curing agents which promote room temperature vulcanization of polydiorganosiloxanes such as those employing metal catalysts in combination with acetoxy-functional silanes or acetamido-functional silanes can be used as long as useful, optically clear elastomeric products can be obtained. Another useful combination of curing agents is exemplified by U.S. Pat. No. 2,823,218 to Speier et al. and by U.S. Pat. No. 3,697,473 to Polmanteer et al., both of which patents are hereby incorporated by reference to teach the various types of organosiloxane compounds containing silicon hydride radicals, platinum catalysts, catalyst inhibitors, and vinyl-containing polydiorganosiloxanes which can be employed by those skilled in the art to produce the optically clear compositions of the present invention. The Polmanteer patent is also incorporated by reference to illustrate one type of composition which can contain silica fillers which are cured to elastomeric products through the use of curing agents which employ the platinum-catalyzed addition of a silicon hydride radical to a silicon-bonded vinyl radical. Other methods for curing the optically clear compositions of the present invention will be apparent to those skilled in the art. The method of curing employed is not critical as long as the resulting product is an optically clear, useful elastomeric product. Surface defects such as fingerprints or those due to mold indentations or scratches on the surfaces of a molded article such as a lens for a gas mask can scatter light and result in a haze value of greater than 4% per 2.54 mm thickness even though the cured elastomer itself has a haze value of less than 4 percent. Therefore, it is preferable to check the optical clarity of a uniform 2.54 mm thickness of the uncured composition to obtain a reliable measure of the haze value and optical transmission value of the compositions.

The compositions of the present invention can also include minor amounts of additives such as compounds which promote adhesion to various substrates (such as gamma-glycidoxypropyltrimethoxysilane as taught in U.S. Pat. No. 4,087,585 to Schultz or ethyl polysilicate as taught in U.S. Pat. No. 3,312,587 to Wilson), heat stability additives, ultraviolet light absorbing compounds, plasticizers, dyes which color, but do not increase the haze value of, the compositions and products, plasticizers and other well-known additives provided that such additives do not result in compositions possessing haze values of greater than 4 percent and luminous transmittance values of at least 85 percent per 2.54 mm thickness.

The curing of said compositions can be accomplished in any well-known manner such as by heating alone, by heating under pressure, mixing a catalyst with the remainder of the composition at room temperature or above, exposing the compositions to the action of moisture or by simply exposing the compositions to radiation in any apparatus or device such as a mold which will result in a cured elastomer having the desired shape. The cured products are silica-reinforced silicone elastomers useful as optically clear articles such as lenses for gas masks, interlayers for windshields, clear tubing, optically clear adhesives or sealants, and when the cured elastomer itself is biocompatible with an animal or human body, the elastomers may be used to produce prosthetic devices such as mammary implants, corneal prostheses such as intraocular lenses and contact lenses and the like.

The following examples are intended as being merely illustrative and are not to be construed as limiting the scope of the present invention to those examples alone. The scope of the present invention is properly defined by the appended claims. All parts and percentages reported in the following examples are by weight unless otherwise indicated. In all cases where the surface-treated silica fillers were prepared by the hydrolysis of an alkyl silicate, the silica filler exhibited 100% hydrophobicity according to the water floatation test described in the patent application to Lutz, supra. That is, 100% of a 0.3 g sample of the filler (dried on a hot-plate at 250° C. for 30 minutes) floated at the top of 2.5 cc of water after the filler and water were vigorously shaken together.

The following polydiorangosiloxanes were used to prepare the compositions described in the examples Gum A-A dimethylvinylsiloxy-endblocked polydiorganosiloxane gum consisting essentially of 99.86 mole percent of dimethylsiloxane units and 0.14 mole percent of methylvinylsiloxane units based upon the total moles of diorganosiloxane units present, the ratio of total moles of organic substituents to silicon atoms (R/Si ratio) being about 2.00 and the Williams plasticity (4.2 g sample) of Gum A being in the range of 55–65 mils (1.40–1.65 mm) and a refractive index of about 1.403 at 25° C., Sodium D wavelength (this temperature and wavelength was used to obtain all the refractive index values which are hereinafter reported).

Gum B-A dimethylvinylsiloxy-endblocked polydiorganosiloxane gum consisting essentially of 88.5 mole percent of dimethylsiloxane units, 11.0 mole percent of phenylmethylsiloxane units and 0.5 mole percent of methylvinylsiloxane units based upon the total moles of diorganosiloxane units present, the Williams plasticity of Gum B being in the range of 50–70 mils (1.27–1.78 mm). The R/Si ratio was about 2.00 and Gum B had a refractive index of about 1.430.

Gum C-A hydroxy-endblocked polydiorganosiloxane gum consisting essentially of 99.5 mole percent of 3,3,3-trifluoropropylmethylsiloxane units and 0.5 mole percent of methylvinylsiloxane units based upon the total moles of diorganosiloxane units present. The Williams plasticity (5.6 g sample) of Gum C was 102 mils (2.59 mm) and had a refractive index of 1.3803. The R/Si ratio was about 2.00.

Gum D-A dimethylvinylsiloxy-endblocked polydimethylsiloxane gum having a Williams plasticity (4.2 g sample) in the range of 55–65 mils (1.40–1.65 mm). The refractive index of the gum was about 1.403 and the R/Si ratio was about 2.00.

EXAMPLES 1–8

Examples 1–8 consist of compositions containing a polydiorganosiloxane gum and various types of hydrophobic reinforcing silica fillers which were prepared for the purpose of measuring the luminous transmittance and the haze values of each composition at room temperature (about 22°–23° C.) according to the procedure described in ASTM D1003-61. Examples 5–8 are comparative examples.

The silica filler used in Examples 1 and 2 was prepared by mixing 410 milliliters (ml) of methanol, 75.4 ml of concentrated aqueous ammonium hydroxide (density ~0.9 g/ml, ~28.4% $NH_3$ content, the symbol "~" means approximately) and 30.8 ml of water together at room temperature in a bottle containing a magnetic stirring bar. Then 60 ml of hexamethyldisilazane was added and the mixture was allowed to stir an additional 10 minutes before 120 ml of methyl orthosilicate was rapidly added. The mixture was then allowed to stir at room temperature until the mixture gelled and the magnetic stirring bar stopped. The gelled silica filler-containing composition was allowed to age for about three hours after the addition of the methyl orthosilicate before it was used to prepare the composition of Example 1. The resulting wet, gelled filler composition (hereinafter Filler Composition I) had a theoretical $SiO_{4/2}$ content of about 8% and contained approximately 15.2 percent by weight of a hydrophobic reinforcing silica filler.

The composition of Example 1 was prepared by slowly incorporating 165 g of Filler Composition I to 50 g of Gum A using a clean two-roll mill. The volatiles were removed by hot milling the mixture for 30 minutes at 105°–110° C. The mixture was then cooled to room temperature. A sheet of the milled composition was removed from the two-roll mill and pressed to a uniform thickness of 1.90 mm (75 mils) between two clean 10.16 cm × 10.16 cm × 0.32 cm (4"×4"×0.125", where the symbol " is inches) plates of glass. Two plates of clean glass were placed together (0.64 cm thickness) and the haze value was found to be 0.6% and the luminous transmittance value was 91.9%. The presence of an air space between the glass plates may affect these values. Some lint or dust particles were observed in the transparent layer as were a small amount of what appeared to be gel particles or filler agglomerates.

Example 2 were prepared using 165 g of Filler Composition I which had been aged about 24 hours at room temperature and 40 g of Gum A. The same mixing technique used in Example 1 was employed except the filler composition and gum were milled together without heating the rolls for a longer period of time prior to the devolatization step to insure that the gelled filler was adequately mixed with the gum because the filler composition contained a large amount of liquid. After being pressed between two clean glass plates as above, this composition was visually observed to contain fewer gel particles than Example 1.

The compositions of Examples 3 and 4 were prepared using Filler Composition II which was prepared according to the same procedure employed in preparing Filler Composition I using the following formulation: 425 ml methanol, 94 ml concentrated aqueous ammonium hydroxide, 4 ml water, 32 g of a solid organosilicon hydrophobing compound consisting principally of hexamethylcyclotrisiloxane (this was used in place of the hexamethyldisilazane in Filler Composition I) and 120 ml methyl orthosilicate.

The composition of Example 3 was prepared using 165 g of Filler Composition II which had been aged for twenty-four hours at room temperature and 50 g of Gum A. This composition was milled together on a two-roll mill and immediately hot-milled for 30 minutes at 105°–110° C. to remove volatile material. A 1.9 mm sample exhibited approximately the same amount of gel particles as did Example 1. Example 4 was prepared using the same formulation as Example 3, but employed the milling procedure described in Example 2. This composition exhibited fewer gel particles than that of Example 3, but had a slightly higher haze value (see Table I). The higher haze value could be due to the presence of more lint or dirt particles in Example 4. However, the examples demonstrate that the filler and gum should be mixed or blended as homogeneously as possible to obtain compositions with optimum optical clarity.

The composition of Example 5 was prepared by alternately adding small increments of a total of 3 grams of hexamethyldisilazane and a total of 20 g of a reinforcing silica filler powder reportedly having a surface area of about 255 $m^2/g$ (Cab-O-Sil® MS-75, product of the Cabot Corporation, Boston, Mass. 02110) to 40 g of Gum A on a cold two-roll mill until all of the filler and hexamethyldisilazane was added to the gum. Then 1 g of water was added to the gum-filler mixture and it was hot-milled for 30 minutes at 105°–110° C. to produce a composition containing a surface-treated filler which was then pressed between two clean glass plates to a thickness of 1.90 mm. The resulting composition contained about 54 parts of filler solids per 100 parts of Gum A. The amount of filler was estimated by assuming that the original amount of silica added was about 92% of the amount of the treated filler (this assumption was also used in reporting the amount of filler in Example 12).

The composition of Example 6 was prepared by slowly adding 9 g of a hydrophobic reinforcing silica filler powder to 30 g of Gum A on a cold two-roll mill. When all the filler was added, the mixture was hot-milled 15 minutes at 105°–110° C., cooled and pressed between two clean glass plates to a uniform thickness of 2.54 mm. The silica powder used in this Example was prepared according to the general procedure of refluxing 320 ml of a deionized sodium silicate solution (calculated to contain the equivalent of 32 g $SiO_{4/2}$ units), 300 ml of a colloidal silica sol containing 48 g $SiO_2$, 180 ml concentrated hydrochloric acid, 100 ml water and 2 g iron(III)chloride for 3 hours. After 3 hours, 300 ml isopropanol and 60 ml trimethylchlorosilane were added and the mixture was allowed to stir for one-half hour. Then 700 ml of toluene was added and the surface-treated silica transfers to the organic toluene phase. The toluene phase containing the silica was recovered, azeotroped to remove water and the silica product obtained from the toluene phase was then dried.

The composition of Example 7 was prepared by first stirring 100 g of a reinforcing silica filler powder (fume silica) which reportedly had a surface area of about 400 $m^2/g$ (Cab-O-Sil® S-17, a product of the Cabot Corporation, Boston, Mass. 02110) into 1000 g of toluene using a nitrogen purge. The slurry that formed was heated to 60° C. and then 20 g of hexamethyldisilazane and 1 g of water was added. The viscosity of the slurry significantly decreased within about three minutes after the addition of the latter two ingredients and the slurry was allowed to stir for an additional 30 minutes after the viscosity change. The slurry was then placed in a flat glass dish and allowed to dry overnight in an air hood. The next day, the remainder of the volatile materials were removed by drying the filler in an air circulating oven at 125° C. Twenty-five grams of the resulting filler was compounded with 50 g of Gum A on a two-roll mill. After all the filler was added and a cohesive sheet had formed, the composition was hot-milled for 30 minutes at 105°–110° C. Then a uniform 2.54 mm thickness of the resulting composition was pressed between two clean glass plates.

The composition of Example 8 was prepared by mixing 50 g of Gum A, 5 g of hexamethyldisilazane and 2 g of water together on an unheated two-roll mill. Then 25 g of the same type of reinforcing silica filler powder used in Example 7 was slowly added to the above mixture. After all of the filler was added and a cohesive sheet had formed, the composition was hot-milled for 30 minutes at 105°–110° C. Then a uniform 2.54 mm thickness of the resulting composition was pressed between two clean glass plates.

The luminous transmittance and haze values for each composition were measured using the previously described hazemeter. When 1.90 mm thicknesses were employed (Examples 1–5), the value of the haze at 2.54 mm was calculated for the purpose of comparing all the samples. The haze values reported are the average of four measurements. The results are summarized in Table I. Examples 1–4 gave haze values of less than 4% using polydiorganosiloxane gums where the organic radicals present were primarily methyl radicals and a small percentage of vinyl radicals while Examples 5–8 had haze values of greater than 8% using the same type of gum even tough several different filler treatment methods and several different silica fillers were employed.

TABLE I

| Example | Filler Loading* (phr) | Haze Value (%) (1.9 mm) | Haze Value (%) (2.54 mm) | Luminous Transmittance (%) (1.9 mm) | Luminous Transmittance (%) (2.54 mm) |
|---|---|---|---|---|---|
| 1 | 50 | 2.58 | 3.43** | 88.0 | — |
| 2 | 60 | 2.03 | 2.71** | 87.8 | — |
| 3 | 50 | 1.53 | 2.03** | 88.2 | — |
| 4 | 50 | 2.13 | 2.83** | 87.5 | — |
| 5 | 54 | 11.2 | 14.9** | 81.9 | — |
| 6 | 30 | — | 13.0 | — | 82.8 |
| 7 | 50 | — | 10.2 | — | 80.1 |
| 8 | 50 | — | 8.6 | — | 85.4 |

*Parts by weight of filler per 100 parts by weight of gum.
**Calculated values.

EXAMPLE 9

Example 9 demonstrates the production of an optically clear composition composed of a fluorine-containing polydiorganosiloxane gum and hydrophobic reinforcing silica filler surface-treated with fluorine-containing organosiloxy units wherein the refractive index of the gum (Gum C-R.I.=1.3803) was not closely matched with the refractive index of the filler.

The filler used in Example 9 was prepared according to the procedure previously described for Filler Composition I and had the following formulation: 88.3 ml methanol, 12.6 ml water, 7.5 ml concentrated aqueous ammonium hydroxide, 20 ml sym-tetramethyl-bis-3,3,3-trifluoropropyldisilazane and 60 ml methyl orthosilicate. This wet, gelled filler composition was aged for two days at room temperature prior to use, contained 23% filler solids and about 14% theoretical $SiO_{4/2}$ content based upon the total weight of the filler composition and is hereinafter referred to as Filler Composition III.

The composition of Example 9 was prepared using a filler loading level of 55 parts of filler solids per 100 parts of Gum C by employing the milling procedure used in Example 2 to blend 72 g of Filler Composition III with 30 g of Gum C. The filler and gum were adequately mixed because the sample had good optical clarity (little noticeable haze) at 105°–110° C. when viewed between the two rollers just prior to being removed from the mill. This visual observation was experimentally confirmed because a uniform 1.9 mm thickness of this composition between two glass plates had a luminous transmittance value of 88.0% and a haze value of 2.5% which was calculated to be a haze value of 3.3% for a 2.54 mm thickness. A simple method to predict whether or not the filler and gum have been properly or homogeneously blended and/or to estimate whether or not a particular filler composition will result in optically clear compositions is to observe the visual clarity of a sample between the rolls of a two-roll mill as it is being milled. If the composition is optically clear at 105°–110° C., then it can be expected to have good optical clarity at room temperature. The final test, however, is to instrumentally measure the luminous transmittance and haze value of the composition as described above.

EXAMPLE 10

This example demonstrates the effect of filler loading on the luminous transmittance and haze values of the compositions of the present invention. The filler used in these examples (Filler Composition IV) was surface-treated using a hydrophobe agent prepared by refluxing a mixture of 100 g of a solid hydrophobe agent consisting principally of hexamethylcyclotrisiloxane, 49.5 g of methanol and 0.5 g of an ammonium gas/methanol solution ($\sim$0.11 g $NH_3$/g of solution) for 2 hours (hereinafter referred to as Hydrophobe Agent Solution A). The hydrophobic reinforcing silica filler-containing composition was prepared using the following formulation: 111 ml methanol, 45 ml concentrated aqueous ammonium hydroxide, 51 ml of the ammonia gas/methanol solution described above, 54 ml of Hydrophobe Agent Solution A and 120 ml of methyl orthosilicate. The filler composition was prepared by mixing the methanol, concentrated aqueous ammonium hydroxide and ammonia gas/methanol solution together and then adding the Hydrophobe Agent Solution A. When the last addition was made, the methyl orthosilicate was rapidly added with stirring and the mixture was allowed to stir until gelation took place. The wet, gelled filler composition was then stored about 4 weeks at room temperature prior to use. The wet, gelled filler composition obtained had a solids content of 25.3%. The amounts of Gum A and filler used are tabulated in Table II and each sample was prepared according to the procedure used in Example 4. The luminous transmittance and haze value are for 2.54 mm thick samples.

TABLE II

| Filler Loading (phr)* | Gum A (g) | Filler Composition IV (g) | Luminous Transmittance (%) | Haze Value (%) |
|---|---|---|---|---|
| 30 | 30 | 35.6 | 86.1 | 4.3 |
| 60 | 30 | 71.1 | 87.5 | 2.5 |
| 90 | 30 | 106.7 | 86.0 | 3.9 |

*Parts of filler solids per 100 parts of Gum A.

In preparing these samples the last sample containing 90 phr (parts of filler solids per 100 parts of gum) of filler had the highest viscosity and required more handling in the laboratory to produce a uniform sheet. The sample containing 30 phr did not form a sheet on the two-roll mill as well as the others and difficulty was also experienced in preparing a uniform sheet. It has a haze value of greater than 4% and is therefore a comparative example. Additional handling results in the inclusion of more foreign matter such as dust which increases the haze value. A one to two percent difference in haze value between compositions having a similar or identical formulation can be due to the presence of such foreign matter. The sample containing 60 phr appeared to contain an optimum level of filler and was the easiest of the three to handle. It therefore offered the least amount of opportunity for contamination. All of the above samples contained some visible particles of foreign material which can be eliminated when such samples are compounded under optimum conditions of cleanliness such as those conditions used in preparing ophthalmic lenses or medical grade elastomers. This example demonstrates that optically clear compositions can be prepared over a wide range of filler loading levels.

EXAMPLES 11–12

These examples demonstrate the difference between an optically clear composition which is obtained by matching the refractive index of a gum to that of the silica filler and an optically clear composition of the present invention which does not require refractive index matching. Example 11 was prepared by blending 30 g of Gum B with 71.1 g of Filler Composition V (18.0 g filler solids) on a two-roll mill until the sample was well-mixed and then the sample was hot-milled at 105°–110° C. for 15 minutes to remove volatile materials. The composition of Example 11 contained a filler loading of 60 phr.

Filler Composition V employed two hydrophobe agents to surface-treat the filler surface and had the following formulation: 111 ml methanol, 45 ml concentrated aqueous ammonium hydroxide, 51 ml of the ammonia gas/methanol solution of Example 10, 54 ml Hydrophobe Agent Solution A, 48 drops (~0.7 g) of a liquid hydrophobe agent consisting principally of 1,3,5-trimethyl-1,3,5-trivinyl-cyclotrisiloxane and 120 ml methyl orthosilicate. Filler Composition V was prepared using the same procedure as that described for Filler Composition IV except that the 48 drops of the liquid hydrophobe agent was added after the addition of the Hydrophobe Agent Solution A and prior to the addition of the methyl orthosilicate. Thus, the hydrophobe agent mixture used to surface-treat this filler contained approximately 2 mole percent of methylvinylsiloxane units based upon the total moles of siloxane units contained in both hydrophobe agents to improve the properties of the elastomer obtained upon curing the elastomer composition. The wet, gelled filler composition contained about 14% by weight of theoretical $SiO_{4/2}$ units and about 23% filler solids.

Example 12, a comparative example, was prepared according to the following general procedure. One hundred parts of Gum B is mixed together with 18.5 parts of hexamethyldisilazane and 4 parts of water in a bread dough mixer. When the mixing is complete, a total of 55 parts of a reinforcing silica filler powder (fume silica) which reportedly had a surface area of about 400 m²/g (Cab-O-Sil ® S-17, a product of the Cabot Corporation, Boston, Mass. 02110) is incrementally added with mixing over a period of about 2 hours until all the filler was incorporated into the gum. Mixing is then continued as the mixture is heated to 225° C. under nitrogen purging. At 225° C., mixing is continued under vacuum conditions for three hours and then the mixture is cooled to room temperature. The resulting composition contained about 60 parts of filler solids per 100 parts by weight of Gum B. A sample of a composition prepared in the above manner was then hot-milled on a two-roll mill for 15 minutes to remove volatile materials before the following evaluations were made.

As noted in Example 9, the clarity of the sample can be observed while it is being milled simply by looking between the gap between the rollers. Since the mill is heated by steam, one can observe the clarity of the sample as it is heated up to about 150° C. The refractive index of a polydiorganosiloxane gum is known to change with temperature. As a sample of an optically clear composition which relies on refractive index matching for its optical clarity is heated, the haze value of the sample should increase as the difference between the refractive index of the gum and filler increases with increasing temperature. This change in haze value is visible to the naked eye and thus the clarity of the compositions of Example 11 and 12 were noted at three temperatures during the hot-milling of each sample. The filler and gum compositions prepared above were each placed in a two-roll mill at room temperature and the haze of each sample in the gap of the rollers at room temperature was visually rated on a scale of 1 to 6 where a rating of 1 is the visually apparent haze of the composition of Examples 11 (3.17% haze value at 2.54 mm thickness) and 12 (4.9% haze value) at room temperature and where a rating of 5 is the visually apparent haze of the composition of Example 8 (8.6% haze value) at room temperature. The steam was turned on and the sample was hot-milled over a period of 15 minutes. The clarity of each sample was visually evaluated when the temperature of the rollers reached about 105° C. and again at a temperature of a little more than 150° C. The results are as follows:

| | Visual Haze Rating | | |
|---|---|---|---|
| | Room Temperature | 105° C. | >150° C. |
| Example 11 | 1 | 1 | 2–3 |
| Example 12 | 1 | 4 | 6 |

As the visual observations demonstrate, the compositions of the present invention have a much lower increase in haze with increasing temperature than a composition which requires refractive index matching of the gum and fume silica filler to obtain optical clarity at room temperature.

To further measure the increase in haze, samples consisting of uniform 2.54 mm sheets of each composition pressed between clean glass plates were prepared and the luminous transmittance value and the haze value of each sample was measured at room temperature (R.T.). One sample of each composition was placed in a 100° C. oven until the temperature of the sample reached 100° C. One sample was then quickly removed from the oven and the luminous transmittance of the sample was measured 30 seconds after being removed from the oven. The haze value measurement was then made and completed 60 seconds after the sample was removed from the oven. Both samples were evaluated in this manner and were believed to be at about 100° C. when the measurements were taken. The results are shown below:

|  | Luminous Transmittance (%) | | Haze Value (%) | |
| --- | --- | --- | --- | --- |
|  | (R.T.) | (~100° C.) | (R.T.) | (~100° C.) |
| Example 11 | 88.4 | 88.2 | 3.1 | 3.1 |
| Example 12 | 86.8 | 84.4 | 4.9 | 7.0 |

The above results show the advantages possessed by certain compositions of the present invention. The luminous transmittance and haze value of the composition of the present invention (Example 11) does not appear to change in a significant manner although the sample (Example 12) which relies upon refractive index matching does. This property can be valuable where an optically clear composition is desired for use as an optically clear interlayer in a windshield for a high speed aircraft where the windshield heats up due to the passage of air molecules over the windshield at supersonic speeds.

EXAMPLES 13-22

These examples demonstrate the variation in physical properties of elastomers obtained by curing compositions of the present invention. The fillers used in these compositions were surface-treated to render the filler hydrophobic. A combination of hydrophobe agents was employed wherein the combination was varied to result in a hydrophobe agent containing from 0.5 to 8 mole percent of methylvinylsiloxane units and from 92 to 99.5 mole percent of dimethylsiloxane units. The mole percentages were based upon the total moles of diorganosiloxane units calculated to be initially present in the combination of hydrophobe agents prior to the addition of the methyl orthosilicate. The fillers were prepared using the same procedure and formulation as that employed in Filler Composition V except that the amount of 1,3,5-trimethyl-1,3,5-trivinylcyclotrisiloxane used in each filler composition was as follows: Examples 13 and 18-12 drops (~0.18 g), Examples 14 and 19-24 drops (~0.36 g), Examples 15 and 20-48 drops (~0.72 g), Examples 16 and 21-96 drops (~1.4 g) and Examples 17 and 22-192 drops (~2.8 g). Thus, the methylvinylsiloxane content of each filler in mole percent was 0.5, 1, 2, 4 and 8 respectively. The fillers were aged at least 24 hours at room temperature prior to use. The solids content for each filler was determined by heating the filler in a 125° C. oven for 2 hours and the average solids content for the five filler containing compositions was 25.3%.

To obtain a filler loading level of 60 parts of silica filler solids per 100 parts by weight of polydiorganosiloxane gum used, 71 g of the wet filler composition was added to 30 g of gum. In Examples 13-17, Gum D was used while in Examples 18-22, Gum A was used. The procedure used for each example was to place 30 g of gum on a two-roll mill at room temperature and then incrementally add a total of 71 g of filler to the gum. When the filler was thoroughly mixed into the gum, milling was continued as the rollers were heated to about 105°-110° C. When the mixture became clear, the hot-milling was continued for another 15 minutes to devolatilze the mixture. The mill was then cooled to room temperature and 18 drops of 2,5dimethyl-2,5-di(t-butylperoxy)hexane catalyst was added to each sample (one part of catalyst per 100 parts of gum). Each sample was pressed into a standard 6.35 cm × 13.97 cm × 0.16 cm molding chase and heat/press cured for 15 minutes at about 170°-175° C. The cured elastomers were then post-cured by heating them in an oven for 4 hours at 200° C.

The average physical properties of the cured elastomers were evaluated using the following ASTM procedures: ASTM D412—ultimate tensile stress (strength), elongation at break and modulus (or tensile stress) at 100% elongation and ASTM D2240—durometer. The "Trouser Leg Tear Value" of each sample was measured following the method of Greensmith and Thomas as described in "Rupture of Rubber III", J. Polymer Science, Interscience Publications, New York, N.Y., 18, pp. 189-200 (1955) which is hereby incorporated by reference to teach this method. The value reported is the average of two measurements and is believed to be a more reproducible method of evaluating the tear value of cured elastomers than the more commonly used Die B tear test outlined in ASTM D624. The results are reported in Table III.

When the above compositions are homogeneously blended together and are reasonably free of foreign matter, the compositions are optically clear. The refractive index of a filler having the same formulation as that used in Examples 15 and 19 was found to be 1.428 ± 0.002 and the refractive index of Gum D is about 1.403.

A composition having the same formulation as that used in Example 17 was prepared according to the mixing procedure employed in Example 4, but was hot-milled for 15 minutes at 105°-110° C. This optically clear composition had a luminous transmittance value of 87.1% and a haze value of 2.5% measured using a 2.54 mm thickness of the composition between two sheets of glass.

TABLE III

| Example | Composition of Hydrophobe Agent[1] | Tensile Strength (MPa)[2] | Elongation At Break (%) | Modulus At 100% Elongation (MPa)[2] | Durometer (Shore A) | Trouser Leg Tear Value (kN/m)[3] |
| --- | --- | --- | --- | --- | --- | --- |
| 13 | 0.5 | 9.62 | 1035 | 0.86 | 51 | 13.1 |
| 14 | 1 | 11.34 | 905 | 1.21 | 58 | 11.9 |
| 15 | 2 | 10.20 | 770 | 1.59 | 60 | 12.1 |
| 16 | 4 | 9.31 | 605 | 2.55 | 65 | 15.4 |
| 17 | 8 | 7.10 | 365 | 3.31 | 75 | 7.0 |
| 18 | 0.5 | 11.17 | 570 | 1.93 | 62 | 9.4 |
| 19 | 1 | 8.14 | 430 | 2.10 | 64 | 11.6 |
| 20 | 2 | 8.07 | 345 | 2.62 | 68 | 11.7 |
| 21 | 4 | 8.62 | 300 | 3.86 | 71 | 4.6 |
| 22 | 8 | 6.17 | 110 | 5.93 | 80 | 0.4 |

[1]Mole percent of methylvinylsiloxane units based on total moles of diorganosiloxane units.
[2]MPa is megapascals (6.895 megapascals (MPa) = 1,000 pounds per square inch (p.s.i.)).
[3]kN/m is kiloNewtons per meter (175 kiloNewtons/meter (kN/m) = 1,000 pounds per inch (p.p.i.)).

EXAMPLE 23

In this example, the luminous transmittance and haze values of an elastomer obtained by curing an optically clear composition of the present invention were measured. The optically clear composition used had the same formulation as that of Example 17 and contained the same level of curing catalyst. A sample of this composition was pressed between two sheets of glass in a 10.16 cm × 10.16 cm × 10.16 cm molding chase in a molding press to form a uniform sheet. To provide a uniform molding surface which was as free of surface defects as possible and which was capable of being easily stripped from the surfaces of the cured elastomer, a sheet of tetrafluoroethylene fluorocarbon polymer film (Teflon ® film-a registered trademark of E.I. duPont de Nemours, Wilmington, Del. 19898) was placed between each glass plate and the optically clear composition such that only the film touched the composition. The heat was turned on and the sample was heated under pressure at a rate of about 5° C. per minute until the temperature reached 170° C. The sample was cured at 170° C. for 15 minutes and the sample was then cooled to room temperature at the same rate it had been heated. One of the glass plates cracked during the heating and left a hairline impression on the sample, but otherwise the molded sample had an excellent surface.

The cured elastomer sheet had an average thickness of about 1.65 mm (65 mils). The haze value of the 1.65 mm sheet itself was 2.5% and the luminous transmittance of the sheet was 93.6%—no glass plates were used in making these measurements. The calculated haze value for a 2.54 mm sample is 3.8% which is within the definition of an optically clear cured elastomer of the present invention. A 2.54 mm sheet of cured elastomer of this type could find use as a lens for a protective mask for the face.

EXAMPLE 24

The hydrophobic reinforcing silica filler used in this Example was prepared according to the procedure previously described for Filler Composition II using the following formulation: 93.7 ml methanol, 18.6 ml water, 7.5 ml concentrated aqueous ammonium hydroxide, 18 g of a solid organosilicon hydrophobing compound consisting principally of hexamethylcyclotrisiloxane and 60 ml methyl orthosilicate. The resulting wet, gelled, silica filler-containing composition contained about 12.5 percent by weight of theoretical $SiO_{4/2}$ units and contained approximately 24 percent by weight of a hydrophobic reinforcing silica filler (hereinafter Filler Composition VI).

To prepare the composition, a sufficient amount of Filler Composition VI was homogeneously blended with Polymer E on a two-roll mill to result in a composition containing 60 parts of filler solids per 100 parts by weight of Polymer E. Polymer E was a methylphenylvinylsiloxy-endblocked polydimethylsiloxane having a viscosity at 25° C. in the range of 1.8 to 2.4 Pa.s (pascal.-seconds) and an average ratio of organic radicals per silicon atom in the range of 2.006 to 2.007. Polymer E had a much lower viscosity than the gums used in the previous examples. Therefore, a small amount of the wet filler composition was added to thicken the Polymer E sample so that it would form a sheet on a two-roll mill. The remainder of the wet, gelled filler composition was incrementally added and then the composition was hot-milled at about 105°–110° C. for 30 minutes to remove volatile material. The composition appeared to be very clear and free of noticeable haze when viewed between the rolls of the mill. The sample was then cooled to room temperature and the following curing agents were blended into the composition in the following order using the two-roll mill to disperse them: 2.7 parts of Polymer F, 0.2 parts of a platinum catalyst solution and 0.07 parts of 2-methyl-3-butyn-2-ol inhibitor compound—these parts are parts by weight per 100 parts by weight of Polymer E. Polymer F was a trimethylsiloxy-endblocked polyorganosiloxane having 37.5 mole percent of dimethylsiloxane units and 62.5 mole percent of methylhydrogensiloxane units where the mole percent is exclusive of the trimethylsiloxy units and having a silicon-bonded hydrogen atom content of 0.7 to 0.8 weight percent. The platinum catalyst solution employed was a chloroplatinic acid complex of divinyltetramethyldisiloxane diluted with a sufficient amount of a dimethylvinylsiloxyendblocked polydimethylsiloxane having a viscosity at 25° C. in the range of 0.3 to 0.5 Pa.s to provide 0.7 weight percent platinum. When the above composition is homogeneously blended, an optically clear composition is obtained.

The above composition was heat/press cured in a molding chase for 15 minutes at 170°–175° C. The cured elastomer had the following physical properties-durometer (Shore A)-48, tensile strength-6.34 MPa, elongation at break-530% and modulus at 100% elongation-1.10 MPa. Another sample which was post-cured for an additional 4 hours at 200° C. after the above heat/press cure had the following physical properties-durometer (Shore A)-52, tensile strength-8.27 MPa, elongation at break-450% and modulus at 100% elongation-2.00 MPa. When the cured elastomer obtained from the above optically clear composition is properly molded, an optically clear elastomer is obtained.

EXAMPLES 25–29

In these Examples, the haze value of several samples of compositions and a sample of a cured elastomer of the present invention was measured at room temperature ($\sim 23°$ C.) and at approximately 100° C. ($\sim 100°$ C.) in a manner similar to the one used in Examples 11 and 12. The initial haze value of the sample was measured (Initial Haze Value in Table IV) and the sample was then placed in a 100°±2° C. oven for about one and one-half to three hours. The sample was quickly removed from the oven and placed in an instrument where the haze value of the sample was immediately measured. The samples were believed to be at about 100°±2° C. when the measurements were made (Heated Haze Value in Table IV). The sample was then allowed to remain in the instrument until it again reached room temperature (approximately 30 minutes) and the haze value was again measured (Cooled Haze Value in Table IV) so that the heated and cooled haze value measurements were measured on the same area of the sample. The results are recorded in Table IV.

Examples 25, 26 and 27 were measured using the same samples that were employed in Examples 3, 4 and 9, respectively, but these measurements were done subsequent to the date that the measurements shown in those Examples were made. Each of the samples was a 1.9 mm thickness of the composition pressed between two sheets of glass and the haze value at 2.54 mm was calculated and is shown in Table IV for purposes of comparison. Example 28 was a 2.54 mm thickness (between two sheets of glass) of a composition that had the same formulation and type of ingredients as used in Example 17, but was compounded independently of the composition employed in Example 17.

Example 29 was a 2.54 mm slab or a cured elastomer. In this Example, the initial haze value was measured on the slab itself without the use of any glass plates. Then the slab was placed between two glass plates and the "sandwich" was heated to 100° C. in the oven. The "sandwich" was quickly removed from the oven, the glass plates were removed within 10–15 seconds and the haze value of the slab was immediately measured to get a Heated Haze Value. The reason this procedure was used to minimize sample cooling between the time the sample was removed from the oven and the time that the haze value was measured. The slab was then allowed to cool to room temperature in the instrument to obtain a Cooled Haze Value.

The cured elastomer slab employed in Example 29 was prepared by homogeneously blending the following on a heated two-roll mill (see the blending procedure used in Examples 13–22): (A) 44 grams of a mixture of 33 parts by weight of a hydroxy-endblocked polydiorganosiloxane gum (Gum G) consisting essentially of 3,3,3-trifluoropropylmethylsiloxane units (Williams plasticity (5.6 g sample) of 147 mils (3.73 mm) and R/Si ratio of about 2.00) and 11 parts by weight of a hydroxy-endblocked polydiorganosiloxane gum (Gum H) consisting essentially of 0.6 mole percent of methylvinylsiloxane units and 99.4 mole percent of 3,3,3-trifluoropropylmethylsiloxane units based upon the total moles of siloxane units present in the polydiorganosiloxane (Williams plasticity (5.6 g sample) of 134 mils (3.40 mm) and an R/Si ratio of about 2.00); (B) 77.1 g of a wet, gelled silica filler composition (Filler Composition VII) which had a measured solids content of 27.3% by weight and (C) 0.5 part by weight per 100 parts by weight of total polydiorganosiloxane gum of 2,5-dimethyl-2,5-di(t-butylperoxy)hexane catalyst (added after the filler was homogeneously blended into the gums). The catalyzed composition was placed in a 2.54 mm deep molding chase and was heat/press cured for 15 minutes at 170°–175° C. and then post-cured by heating it in an oven for 4 hours at 200° C. to produce a slab of cured elastomer that was 2.54 mm thick.

Filler Composition VII was prepared by adding the following ingredients together, one after another with stirring, in the following order: 111 ml methanol, 51 ml of an ammonia gas/methanol solution of the type described in Example 10, 45 ml concentrated ammonium hydroxide, 31.67 g of a solid organosilicon hydrophobing compound consisting principally of 1,3,5-trimethyl-1,3,5-trifluoropropylcyclotrisiloxane (heated to just above room temperature to render the compound fluid), 0.35 g of a solid hydrophobing compound consisting principally of 1,3,5-trimethyl-1,3,5-trivinylcyclotrisiloxane and 120 ml of methyl orthosilicate. The filler composition formed a gel and was allowed to stand at room temperature prior to use for a sufficient amount of time to allow the silica filler to become hydrophobic.

As can be seen from Table IV, the haze value of Example 25 changed by 0.89% per 2.54 mm thickness which is less than 1% per 2.54 mm thickness upon heating from ~23° C. to ~100° C., but for the same area of measurement, changed by 1.4% per 2.54 mm thickness upon cooling. Example 26 changed by 1.14% per 2.54 mm thickness upon being heated, but the same area changed by only 0.9% per 2.54 mm thickness upon cooling. Example 27 was a fluorosilicone composition and even at the relatively high filler loading level employed, the change in haze value was no more than 0.2% per 2.54 mm thickness at its maximum. Examples 28 and 29 employed approximately 60 grams of filler per 100 cc of polydiorganosiloxane and the deviation of about 2 grams from the value of 60 grams called for in the heating test used to identify compositions possessing a preferred degree of optical clarity was felt to be within experimental error of the 60 gram figure specified. In both cases, the change in haze value from Initial to Heated Haze Value and from Heated to Cooled Haze Value was less than 0.7% per 2.54 mm thickness which was well within the haze value specified by the heating test.

After the haze values reported in Table IV were obtained, luminous transmittance values corresponding to each type of haze value (Initial, Heated and Cooled) reported in Table IV were obtained by following the general procedure outlined above for the haze value measurements. The Initial Luminous Transmittance Value (23° C.), the Heated Luminous Transmittance Value (100° C.) and the Cooled Luminous Transmittance Value (23° C.), respectively, obtained for each sample were as follows: Example 25-86.1%, 84.7%, 85.4%; Example 26-87.5%, 85.9%, 86.8%; Example 27-86.9%, 86.2%, 87.1%; Example 28-86.6%, 84.9%, 86.1%; and Example 29-90.9%, 91.0%, 91.0%. The luminous transmittance values reported for Examples 25–27 are for 1.9 mm thicknesses of the sample while Examples 28 and 29 are for 2.54 mm thicknesses of the sample.

TABLE IV

| Example | Filler Loading* | Initial Haze Value (~23° C.) (%)** | Heated Haze Value (~100° C.) (%)** | Cooled Haze Value (~23° C.) (%)** |
| --- | --- | --- | --- | --- |
| 25 | 48.7 | 3.41 (2.55) | 4.3 (3.2) | 2.9 (2.2) |
| 26 | 48.7 | 3.26 (2.45) | 4.4 (3.3) | 3.5 (2.6) |
| 27 | 71.5 | 3.61 (2.70) | 3.5 (2.6) | 3.3 (2.5) |
| 28 | 58.1 | 2.6 | 3.3 | 2.8 |
| 29 | 61.8 | 3.7 | 4.2 | 3.6 |

*Parts of filler solids per 100 cc of polydiorganosiloxane.
**The first figure is for 2.54 mm thickness and, if it is followed by a figure in parentheses, is a calculated value that is based upon the measured haze value for the 1.9 mm thickness set forth in parentheses.

EXAMPLE 30

This Example demonstrates the production of a composition containing a lower molecular weight polydiorganosiloxane fluid and a hydrophobic, reinforcing silica filler wherein the optical properties of the composition are such that a 2.54 mm thickness of the homogeneous mixture of the two possess a luminous transmittance value of greater than 85% and a haze value of less than 4% per 2.54 mm thickness at 23°±2° C., but which increases in haze value by more than 1% per 2.54 mm thickness when it is heated from 23° C. to 100° C.

The polydiorganosiloxane employed (Polymer I) was a dimethylvinylsiloxy-endblocked polydimethylsiloxane having a viscosity of about 29 Pa.s at 25° C. The silica filler composition (Filler Composition VIII) was prepared by adding the following ingredients together, one after another with stirring, in the following order: 196.5 ml methanol, 76.5 ml of an ammonia gas/methanol solution of the type described in Example 10, 48 g of an organosilicon hydrophobing composition that was principally composed of octamethylcyclotetrasiloxane and contained minor amounts of other lower molecular weight cyclic polysiloxanes such as hexamethylcyclotrisiloxane, 1.2 g of a solid hydrophobe agent consisting principally of 1,3,5,7-tetramethyl-1,3,5,7-tetravinylcyclotetrasiloxane and 180 ml of methyl orthosilicate. After a suitable aging period at room temperature, the wet, gelled composition contained a hydrophobic reinforcing silica filler at a solids content believed to be about 25 weight percent of the total composition.

The optically clear composition was prepared according to a master-batching procedure wherein a portion of the Polymer I was withheld while the Polymer I and the wet, gelled Filler Composition VIII were being blended together on a two-roll mill such that the amount of filler present during the milling procedure was 80 parts of filler solids per 100 parts of Polymer I. After 30 minutes of mixing at 105°–110° C. on the two-roll mill, the remainder of the Polymer I was added to the ingredients resulting in a composition containing 60 parts of filler solids per 100 parts of Polymer I (approximately 60 parts of filler solids per 100 cc of Polymer I).

A 2.56 mm thickness of the homogeneously blended composition between two sheets of glass possessed a haze value of 2.3% per 2.54 mm thickness and a luminous transmittance value of 87.6%, both of which were measured at room temperature (~23° C.). However, when the sample was placed in a 100° C. oven until the sample reached 100° C. and the haze value of the sample was measured within 30 seconds after it was removed from the oven, the haze value was found to be 3.9% per 2.54 mm thickness. The sample was allowed to cool to room temperature (approximately 30 minutes) in the haze measuring instrument and the haze value after cooling was found to again be 2.3% per 2.54 mm thickness which is a change of 1.6% per 2.54 mm thickness upon heating from ~23° C. to ~100° C.

That which is claimed is:

1. An optically clear composition curable to an elastomer which comprises:
   (A) 100 parts by weight of at least one polydiorganosiloxane consisting essentially of siloxane units selected from the group consisting of siloxane units of the unit formula

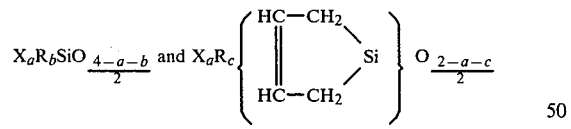

wherein each R radical is selected from the group consisting of alkyl radicals of from 1 to 6 inclusive carbon atoms, cyclohexyl radicals, phenyl radicals, halogenated alkyl radicals of from 1 to 10 inclusive carbon atoms and alkenyl radicals of from 2 to 6 inclusive carbon atoms, each X being selected from the group consisting of hydroxyl radicals, hydrogen radicals and alkoxy radicals of from 1 to 6 inclusive carbon atoms, at least 50 percent of the total amount of R radicals and

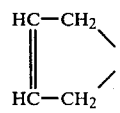

radicals present in said polydiorganosiloxane being methyl radicals, a having a value of from 0 to 1 inclusive, b having a value of from 1 to 3 inclusive and c having a value of from 0 to 1 inclusive, the sum of a+b having a value of from 1 to 3 inclusive, the sum of a+c having a value of from 0 to 1 inclusive, the values of a, b and c being such that the ratio of total R radicals and

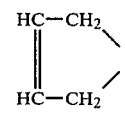

radicals to total silicon atoms present in said polydiorganosiloxane is in the range of from 1.98/1 to 2.02/1 inclusive, said polydiorganosiloxane having a viscosity of at least 0.1 pascal.seconds at 25° C., and (B) 15 to 120 parts by weight of a hydrophobic reinforcing silica filler consisting essentially of surface-treated silica particles wherein said particles consist essentially of SiO$_{4/2}$ units containing a sufficient amount of organosiloxy units chemically bonded to the surface of said particles to render the silica filler hydrophobic, said organosiloxy units being selected from the group consisting of R$_3$SiO$_{1/2}$ units, R$_2$SiO units, O$_{1/2}$R$_2$SiO(R$_2$SiO)$_d$SiR$_2$O$_{1/2}$ units, XR$_2$SiO(R$_2$SiO)$_d$SiR$_2$O$_{1/2}$ units and mixtures thereof where each R and each X are as above defined and d has an average value of from 1 to 12 inclusive, wherein substantially all of said particles have an aggregate particle size of no greater than 4,000 Angstroms in their largest dimension and are of an overall particle size distribution which is sufficiently small such that when 60 parts by weight of said filler is homogeneously mixed with 100 cubic centimeters at 23°±2° C. of a polydiorganosiloxane of the type described in (A) to form a test blend, wherein (1) the refractive index (at 25° C., sodium D line) of the polydiorganosiloxane chosen for use in said blend differs from the refractive index (at 25° C., sodium D line) of the filler by at least 0.025 units and (2) the organosiloxy units employed to render said filler hydrophobic are primarily the same as the R radicals and the

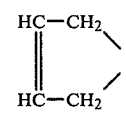

radicals present in the polydiorganosiloxane chosen for use in said blend, then the test blend possesses a haze value of less than 4% per 2.54 millimeter thickness of said blend at 23°±2° C. according to the procedure set out in ASTM D1003-61;

wherein the mixture of (A) and (B) is an optically clear composition possessing a luminous transmittance value of at least 85% and a haze value of no greater than 4% per 2.54 millimeter thickness of said composition at 23°±2° C. according to the procedure set out in ASTM D1003-61.

2. The composition as claimed in claim 1 wherein the haze value of a composition consisting of a mixture of 100 cubic centimeters of (A) at 23°±2° C. and 60 grams of (B) does not increase by more than 1% per 2.54 millimeter thickness of said mixture upon heating the mixture from 23°±2° C. to 100°±5° C.

3. The composition as claimed in claims 1 or 2 wherein each R radical is selected from the group consisting of methyl radicals, vinyl radicals and 3,3,3-trifluoropropyl radicals and wherein no more than 5 mole percent of the siloxane units contain vinyl radicals, there being no more than one vinyl radical per siloxane unit, the mole percent of said siloxane units being based upon the total moles of siloxane units present in said polydiorganosiloxane.

4. The composition as claimed in claims 1 or 2 wherein the refractive index of (A) at 25° C., Sodium D wavelength, differs from the refractive index of (B) by at least 0.025 units.

5. The composition as claimed in claims 1 or 2 wherein the amount of (B) present is in a range of from 40 to 90 parts by weight per 100 parts by weight of (A) and said organosiloxy units of (B) are derived from organosilicon hydrophobing compounds selected from the group consisting of $R_nSiY_{4-n}$, $(R_3Si)_2NH$, $(R_3Si)_2O$, $(R_2SiO)_e$, $(R_2SiNH)_e$, $R'O(R_2SiO)_dR'$, $(R_3Si)_2NR''$, $(R_2SiNR'')_e$, and mixtures of the same where each R' is hydrogen or R'', each R'' is an alkyl radical of from 1 to 4 inclusive carbon atoms, each Y is —OH, OR', —NHR'' or —NR''$_2$, e has an average value of from 3 to 6 inclusive, and n has an average value of from 2 to 3 inclusive.

6. The composition as claimed in claim 1 wherein said organosiloxy units of (B) are derived from organosilicon hydrophobing compounds selected from the group consisting of $R_nSiY_{4-n}$, $(R_3Si)_2NH$, $(R_3Si)_2O$, $(R_2SiO)_e$, $(R_2SiNH)_e$, $R'O(R_2SiO)_dR'$, $(R_3Si)_2NR''$, $(R_2SiNR'')_e$, and mixtures of the same where each R' is hydrogen or R'', each R'' is an alkyl radical of from 1 to 4 inclusive carbon atoms, each Y is —OH, —OR', —NHR'' or —NR''$_2$, e has an average value of from 3 to 6 inclusive, and n has an average value of from 2 to 3 inclusive and wherein (B) is a hydrophobic reinforcing silica filler obtained from the alkaline hydrolysis of $Si(OCH_3)_4$ in the presence of at least 70% of one-half of the stoichiometric amount of water required to completely hydrolyze the theoretical amount of —OCH$_3$ radicals present in the $Si(OCH_3)_4$, at least one alcohol selected from the group consisting of methanol, ethanol, n-propanol and isopropanol, at least one organosilicon hydrophobing compound, and at least one basic catalyst.

7. The composition as claimed in claim 6 wherein the refractive index of (A) at 25° C., sodium D wavelength, differs from the refractive index of (B) by at least 0.025 units.

8. The composition as claimed in claim 6 wherein each R radical is selected from the group consisting of methyl radicals, vinyl radicals and 3,3,3-trifluoropropyl radicals and wherein no more than 5 mole percent of the siloxane units contain vinyl radicals, there being no more than one vinyl radical per siloxane unit, the mole percent of said siloxane units being based upon the total moles of siloxane units present in said polydiorganosiloxane.

9. The composition as claimed in claim 5 wherein (B) is a hydrophobic reinforcing silica filler obtained from the alkaline hydrolysis of $Si(OCH_3)_4$ in the presence of at least 70% of one-half of the stoichiometric amount of water required to completely hydrolyze the theoretical amount of —OCH$_3$ radicals present in the $Si(OCH_3)_4$, at least one alcohol selected from the group consisting of methanol, ethanol, n-propanol and isopropanol, at least one basic catalyst, and at least one of said organosilicon hydrophobing compounds.

10. The composition as claimed in claim 9 wherein said organosilicon hydrophobing compound is at least one compound selected from the group consisting of $\{(CH_3)_3Si\}_2NH$, $\{(CH_3)_2(CF_3CH_2CH_2)Si\}_2NH$, $\{(CH_3)R'''SiO\}_e$, $CH_3O\{(CH_3)R'''SiO\}_dR''''$ and $(CH_3)R'''Si(OR'')_2$ where R''' is a methyl radical, a 3,3,3-trifluoropropyl radical or a vinyl radical, each R'''' is hydrogen or a methyl radical and the average value of e is 3.

11. The composition as claimed in claim 10 wherein the refractive index of (A) at 25° C., sodium D wavelength, differs from the refractive index of (B) by at least 0.025 units.

12. The composition as claimed in claim 10 wherein each R radical is selected from the group consisting of methyl radicals, vinyl radicals and 3,3,3-trifluoropropyl radicals and wherein no more than 5 mole percent of the siloxane units contain vinyl radicals, there being no more than one vinyl radical per siloxane unit, the mole percent of said siloxane units being based upon the total moles of siloxane units present in said polydiorganosiloxane.

13. The composition as claimed in claim 9 wherein each R radical present in said polydiorganosiloxane is selected from the group consisting of methyl radicals and vinyl radicals, wherein no more than 5 mole percent of the siloxane units contain vinyl radicals, there being no more than one vinyl radical per siloxane unit, the mole percent of said siloxane units being based upon the total moles of siloxane units present in said polydiorganosiloxane and wherein said organosiloxy units of (B) consist primarily of organosiloxy units wherein each R radical is selected from the group consisting of methyl radicals and vinyl radicals.

14. The composition as claimed in claim 13 wherein said (A) is a polydiorganosiloxane gum having a viscosity of at least 10 kilopascal.seconds at 25° C. and wherein at least two siloxane units present in said (A) contain vinyl radicals, any X radicals present in said (A) being hydroxyl radicals.

15. The composition as claimed in claim 9 wherein each R radical present in said polydiorganosiloxane is selected from the group consisting of methyl radicals, vinyl radicals and 3,3,3-trifluoropropyl radicals, wherein at least 7 mole percent of the siloxane units present in said polydiorganosiloxane contain 3,3,3-trifluoropropyl radicals and no more than 5 mole percent of the siloxane units present in said polydiorganosiloxane contain vinyl radicals, there being no more than one vinyl radical per siloxane unit and no more than one 3,3,3-trifluoropropyl radical per siloxane unit, the mole percent of said siloxane units being passed upon the total moles of siloxane units present in said polydiorganosiloxane and wherein said organosiloxy units of (B) consist primarily of organosiloxy units containing one 3,3,3-trifluoropropyl radical per silicon atom, each of the remaining R radicals being selected from the group consisting of methyl radicals and vinyl radicals.

16. The composition as claimed in claim 15 wherein said (A) is a polydiorganosiloxane gum having a viscosity of at least 10 kilopascal.seconds at 25° C., wherein at least 95 mole pecent of the siloxane units present in said gum contain 3,3,3-trifluoropropyl radicals and at least two siloxane units present in said (A) contain vinyl radicals, any X radicals present in said (A) being hydroxyl radicals.

17. The composition as claimed in claim 8 wherein the method by which the filler is obtained comprises the steps of
- (I) mixing said water, alcohol and any basic catalyst not provided by the organosilicon hydrophobing compounds together to form a solution,
- (II) mixing the total amount of said organosilicon hydrophobing compounds into the solution to form a mixture,
- (III) mixing the $Si(OCH_3)_4$ into the mixture to form a composition containing a silica filler, and
- (IV) aging the composition for a sufficient amount of time to render the silica filler present in said composition hydrophobic, thereby obtaining a composition containing a hydrophobic reinforcing silica filler.

18. The composition as claimed in claim 8 wherein the method by which the filler is obtained comprises the steps of
- (I) mixing said water, alcohol and any basic catalyst not provided by the organosilicon hydrophobing compounds together to form a solution,
- (II) adding a solution composed of the $Si(OCH_3)_4$ and the total amount of said organosilicon hydrophobing compounds to the solution of step (I) to form a composition containing a silica filler, and
- (III) aging the composition for a sufficient amount of time to render the silica filler present in said composition hydrophobic, thereby obtaining a composition containing a hydrophobic reinforcing silica filler.

19. The composition as claimed in claim 12 wherein the method by which the filler is obtained comprises the steps of
- (I) mixing said water, alcohol and any basic catalyst not provided by the organosilicon hydrophobing compounds together to form a solution,
- (II) mixing the total amount of said organosilicon hydrophobing compounds into the solution to form a mixture,
- (III) mixing the $Si(OCH_3)_4$ into the mixture to form a composition containing a silica filler, and
- (IV) aging the composition for a sufficient amount of time to render the silica filler present in said composition hydrophobic, thereby obtaining a composition containing a hydrophobic reinforcing silica filler.

20. The composition as claimed in claim 12 wherein the method by which the filler is obtained comprises the steps of
- (I) mixing said water, alcohol and any basic catalyst not provided by the organosilicon hydrophobing compounds together to form a solution,
- (II) adding a solution composed of the $Si(OCH_3)_4$ and the total amount of said organosilicon hydrophobing compounds to the solution of step (I) to form a composition containing a silica filler, and
- (III) aging the composition for a sufficient amount of time to render the silica filler present in said composition hydrophobic, thereby obtaining a composition containing a hydrophobic reinforcing silica filler.

21. The composition as claimed in claims 1 or 2 which additionally contains at least one curing agent.

22. The composition as claimed in claim 3 which additionally contains at least one curing agent.

23. The composition as claimed in claim 4 which additionally contains at least one curing agent.

24. The composition as claimed in claim 7 which additionally contains at least one curing agent.

25. The composition as claimed in claim 8 which additionally contains at least one curing agent.

26. The composition as claimed in claim 9 which additionally contains at least one curing agent.

27. The composition as claimed in claim 11 which additionally contains at least one curing agent.

28. The composition as claimed in claim 12 which additionally contains at least one curing agent.

29. The composition as claimed in claim 14 which additionally contains at least one curing agent.

30. The composition as claimed in claim 16 which additionally contains at least one curing agent.

31. The composition as claimed in claim 17 which additionally contains at least one curing agent.

32. The composition as claimed in claim 18 which additionally contains at least one curing agent.

33. The composition as claimed in claim 19 which additionally contains at least one curing agent.

34. The composition as claimed in claim 20 which additionally contains at least one curing agent.

35. An optically clear elastomer which comprises the product formed upon curing the composition of claims 1 or 2.

36. An optically clear elastomer which comprises the product formed upon curing the composition of claim 3.

37. An optically clear elastomer which comprises the product formed upon curing the composition of claim 4.

38. An optically clear elastomer which comprises the product formed upon curing the composition of claim 7.

39. An optically clear elastomer which comprises the product formed upon curing the composition of claim 8.

40. An optically clear elastomer which comprises the product formed upon curing the composition of claim 9.

41. An optically clear elastomer which comprises the product formed upon curing the composition of claim 11.

42. An optically clear elastomer which comprises the product formed upon curing the composition of claim 12.

43. An optically clear elastomer which comprises the product formed upon curing the composition of claim 14.

44. An optically clear elastomer which comprises the product formed upon curing the composition of claim 16.

45. An optically clear elastomer which comprises the product formed upon curing the composition of claim 17.

46. An optically clear elastomer which comprises the product formed upon curing the composition of claim 18.

47. An optically clear elastomer which comprises the product formed upon curing the composition of claim 19.

48. An optically clear elastomer which comprises the product formed upon curing the composition of claim 20.

49. An optically clear elastomer which comprises the product formed upon curing the composition of claim 21.

50. An optically clear elastomer which comprises the product formed upon curing the composition of claim 22.

51. An optically clear elastomer which comprises the product formed upon curing the composition of claim 23.

52. An optically clear elastomer which comprises the product formed upon curing the composition of claim 24.

53. An optically clear elastomer which comprises the product formed upon curing the composition of claim 25.

54. An optically clear elastomer which comprises the product formed upon curing the composition of claim 26.

55. An optically clear elastomer which comprises the product formed upon curing the composition of claim 27.

56. An optically clear elastomer which comprises the product formed upon curing the composition of claim 28.

57. An optically clear elastomer which comprises the product formed upon curing the composition of claim 29.

58. An optically clear elastomer which comprises the product formed upon curing the composition of claim 30.

59. An optically clear elastomer which comprises the product formed upon curing the composition of claim 31.

60. An optically clear elastomer which comprises the product formed upon curing the composition of claim 32.

61. An optically clear elastomer which comprises the product formed upon curing the composition of claim 33.

62. An optically clear elastomer which comprises the product formed upon curing the composition of claim 34.

63. A method for producing an optically clear composition curable to an elastomer which comprises the steps of (I) mixing (A) 100 parts by weight of at least one polydiorganosiloxane consisting essentially of siloxane units selected from the group consisting of siloxane units of the unit formula

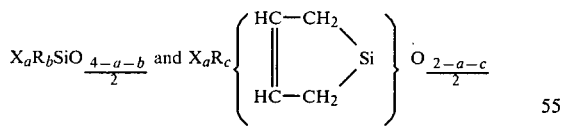

wherein each R radical is selected from the group consisting of alkyl radicals of from 1 to 6 inclusive carbon atoms, cyclohexyl radicals, phenyl radicals, halogenated alkyl radicals of from 1 to 10 inclusive carbon atoms and alkenyl radicals of from 2 to 6 inclusive carbon atoms, each X being selected from the group consisting of hydroxyl radicals, hydrogen radicals and alkoxy radicals of from 1 to 6 inclusive carbon atoms, at least 50 percent of the total amount of R radicals and

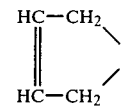

radicals present in said polydiorganosiloxane being methyl radicals, a having a value of from 0 to 1 inclusive, b having a value of from 1 to 3 inclusive and c having a value of from 0 to 1 inclusive, the sum of a+b having a value of from 1 to 3 inclusive, the sum of a+c having a value of from 0 to 1 inclusive, the values of a, b and c being such that the ratio of total R radicals and

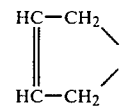

radicals to total silicon atoms present in said polydiorganosiloxane is in the range of from 1.98/1 to 2.02/1 inclusive, said polydiorganosiloxane having a viscosity of at least 0.1 pascal.-seconds at 25° C., and (B) a sufficient amount of a wet, gelled filler composition to provide from 15 to 120 parts by weight per 100 parts by weight of (A) of a hydrophobic reinforcing silica filler consisting essentially of surface-treated silica particles wherein said particles consist essentially of SiO$_{4/2}$ units containing a sufficient amount of organosiloxy units chemically bonded to the surface of said particles to render the silica filler hydrophobic, said organosiloxy units being selected from the group consisting of R$_3$SiO$_{1/2}$ units, R$_2$SiO units, O$_{1/2}$R$_2$SiO(R$_2$SiO)$_d$SiR$_2$O$_{1/2}$ units, XR$_2$SiO(R$_2$SiO)$_d$SiR$_2$O$_{1/2}$ units and mixtures thereof where each R and each X are as above defined and d has an average value of from 1 to 12 inclusive, wherein substantially all of said particles have an aggregate particle size of no greater than 4,000 Angstroms in their largest dimension and are of an overall particle size distribution which is sufficiently small such that when a sufficient amount of said wet, gelled filler composition to provide 60 parts by weight of said filler is homogeneously mixed with 100 cubic centimeters at 23°±2° C. of a polydiorganosiloxane of the type described in (A) to form a test blend, wherein (1) the refractive index (at 25° C., sodium D line) of the polydiorganosiloxane chosen for use in said blend differs from the refractive index (at 25° C., sodium D line) of the filler by at least 0.025 units and (2) the organosiloxy units employed to render said filler hydrophobic are primarily the same as the R radicals and the

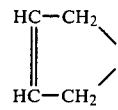

radicals present in the polydiorganosiloxane chosen for use in said blend, then the test blend possesses a haze value of less than 4% per 2.54 millimeter thickness of said blend at 23°±2° C. according to the procedure set out in ASTM D1003-61, to form a mixture, and (II) removing the volatile portion of said mixture whereby an optically clear composition curable to an elastomer is obtained, and wherein, when the volatile portion has been removed, the mixture of (A) and (B) is an optically clear composition possessing a luminous transmittance value of at least 85% and a haze value of no greater than 4% per 2.54 millimeter thickness of said composition at 23°±2° C. according to the procedure set out in ASTM D1003-61.

64. The method as claimed in claim 63 wherein the haze value of a composition consisting of a mixture of 100 cubic centimeters of (A) at 23°±2° C. and 60 grams of (B) does not increase by more than 1% per 2.54 millimeter thickness of said mixture upon heating the mixture from 23°±2° C. to 100°±5° C.

65. The method as claimed in claims 63 or 64 which additionally includes the step (III) of mixing at least one curing agent into the composition.

66. A method for producing an optically clear composition curable to an elastomer which comprises the steps of (I) mixing
(A) 100 parts by weight of at least one polydiorganosiloxane consisting essentially of siloxane units selected from the group consisting of siloxane units of the unit formula

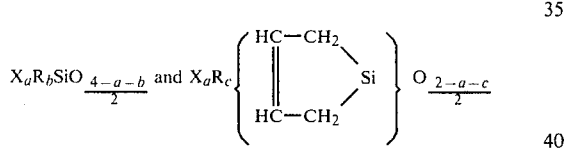

wherein each R radical is selected from the group consisting of alkyl radicals of from 1 to 6 inclusive carbon atoms, cyclohexyl radicals, phenyl radicals, halogenated alkyl radicals of from 1 to 10 inclusive carbon atoms and alkenyl radicals of from 2 to 6 inclusive carbon atoms, each X being selected from the group consisting of hydroxyl radicals, hydrogen radicals and alkoxy radicals of from 1 to 6 inclusive carbon atoms, at least 50 percent of the total amount of R radicals and

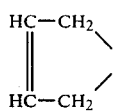

radicals present in said polydiorganosiloxane being methyl radicals, a having a value of from 0 to 1 inclusive, b having a value of from 1 to 3 inclusive and c having a value of from 0 to 1 inclusive, the sum of a+b having a value of from 1 to 3 inclusive, the sum of a+c having a value of from 0 to 1 inclusive, the values of a, b and c being such that the ratio of total R radicals and

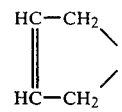

radicals to total silicon atoms present in said polydiorganosiloxane is in the range of from 1.98/1 to 2.02/1 inclusive, said polydiorganosiloxane having a viscosity of at least 0.1 pascal.-seconds at 25° C., and (B) a sufficient amount of a wet, fluid filler composition to provide from 15 to 120 parts by weight per 100 parts by weight of (A) of a hydrophobic reinforcing silica filler consisting essentially of surface-treated silica particles wherein said particles consist essentially of $SiO_{4/2}$ units containing a sufficient amount of organosiloxy units chemically bonded to the surface of said particles to render the silica filler hydrophobic, said organosiloxy units being selected from the group consisting of $R_3SiO_{1/2}$ units, $R_2SiO$ units, $O_{1/2}R_2Si$-$O(R_2SiO)_dSiR_2O_{1/2}$ units, $XR_2SiO(R_2SiO)_dSiR_2O_{1/2}$ units and mixtures thereof where each R and each X are as above and d has an average value of from 1 to 12 inclusive, wherein substantially all of said particles have an aggregate particle size of no greater than 4,000 Angstroms in their largest dimension and are of an overall particle size distribution which is sufficiently small such that when a sufficient amount of said wet, fluid filler composition to provide 60 parts by weight of said filler is homogeneously mixed with 100 cubic centimeters at 23°±2° C. of a polydiorganosiloxane of the type described in (A) to form a test blend, wherein (1) the refractive index (at 25° C., sodium D line) of the polydiorganosiloxane chosen differs from the refractive index (at 25° C., sodium D line) of the filler by at least 0.025 units and (2) the organosiloxy units employed to render said filler hydrophobic are primarily the same as the R radicals and the

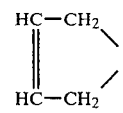

radicals present in the polydiorganosiloxane chosen for use in said test blend, then the test blend possesses a haze value of less than 4% per 2.54 millimeter thickness of said blend at 23°±2° C. according to the procedure set out in ASTM D1003-61, to form a mixture, and (II) removing the volatile portion of said mixture whereby an optically clear composition curable to an elastomer is obtained, and wherein, when the volatile portion has been removed, the mixture of (A) and (B) is an optically clear composition possessing a luminous transmittance value of at least 85% and a haze value of no greater than 4% per 2.54 millimeter thickness of said composition at 23°±2° C. according to the procedure set out in ASTM D1003-61.

67. The method as claimed in claim 66 wherein the haze value of a composition consisting of a mixture of 100 cubic centimeters of (A) at 23°±2° C. and 60 grams of (B) does not increase by more than 1% per 2.54 millimeter thickness of said mixture upon heating the mixture from 23°±2° C. to 100°±5° C.

68. The method as claimed in claims 66 or 67 which additionally includes the step (III) of mixing at least one curing agent into the composition.

69. An optically clear elastomer which comprises the product formed upon curing the composition of claim 1 wherein said product is in the form of a biocompatible prosthetic device.

70. An optically clear elastomer which comprises the product formed upon curing the composition of claim 2 wherein said product is in the form of a biocompatible prosthetic device.

71. An optically clear elastomer which comprises the product formed upon curing the composition of claim 6 wherein said product is in the form of a biocompatible prosthetic device.

72. An optically clear elastomer which comprises the product formed upon curing the composition of claim 8 wherein said product is in the form of a biocompatible prosthetic device, each R radical present in said polydiorganosiloxane being selected from the group consisting of methyl radicals and vinyl radicals, wherein no more than 5 mole percent of the siloxane units contain vinyl radicals, there being no more than one vinyl radical per siloxane unit, the mole percent of said siloxane units being based upon the total moles of siloxane units present in said polydiorganosiloxane and wherein said organosiloxy units of (B) consist primarily of organosiloxy units wherein each R radical is selected from the group consisting of methyl radicals and vinyl radicals.

73. The method as claimed in claim 63 wherein said organosiloxy units of said filler are derived from organosilicon hydrophobing compounds selected from the group consisting of $R_nSiY_{4-n}$, $(R_3Si)_2NH$, $(R_3Si)_2O$, $(R_2SiO)_e$, $(R_2SiNH)_e$, $R'O(R_2SiO)_dR'$, $(R_3Si)_2NR''$, $(R_2SiNR'')_e$, and mixtures of the same where each R' is hydrogen or R'', each R'' is an alkyl radical of from 1 to 4 inclusive carbon atoms, each Y is —OH, —OR', —NHR'' or —NR''$_2$, e has an average value of from 3 to 6 inclusive, and n has an average of from 2 to 3 inclusive and wherein the wet, gelled filler composition is obtained from the alkaline hydrolysis of $Si(OCH_3)_4$ in the presence of at least 70% of one-half of the stoichiometric amount of water required to completely hydrolyze the theoretical amount of —OCH$_3$ radicals present in the $Si(OCH_3)_4$, at least one alcohol selected from the group consisting of methanol, ethanol, n-propanol and isopropanol, at least one of said organosilicon hydrophobing compounds, and at least one basic catalyst.

74. The method as claimed in claim 64 wherein said organosiloxy units of said filler are derived from organosilicon hydrophobing compounds selected from the group consisting of $R_nSiY_{4-n}$, $(R_3Si)_2NH$, $(R_3Si)_2O$, $(R_2SiO)_e$, $(R_2SiNH)_e$, $R'O(R_2SiO)_dR'$, $(R_3Si)_2NR''$, $(R_2SiNR'')_e$, and mixtures of the same where each R' is hydrogen or R'', each R'' is an alkyl radical of from 1 to 4 inclusive carbon atoms, each Y is —OH, —OR', —NHR'' or —NR''$_2$, e has an average value of from 3 to 6 inclusive, and n has an average value of from 2 to 3 inclusive and wherein the wet, gelled filler composition is obtained from the alkaline hydrolysis of $Si(OCH_3)_4$ in the presence of at least 70% of one-half of the stoichiometric amount of water required to completely hydrolyze the theoretical amount of —OCH$_3$ radicals present in the $Si(OCH_3)_4$, at least one alcohol selected from the group consisting of methanol, ethanol, n-propanol and isopropanol, at least one of said organosilicon hydrophobing compounds, and at least one basic catalyst.

75. The composition as claimed in claim 66 wherein said organosiloxy units of said filler are derived from organosilicon hydrophobing compounds selected from the group consisting of $R_nSiY_{4-n}$, $(R_3Si)_2NH$, $(R_3Si)_2O$, $(R_2SiO)_e$, $(R_2SiNH)_e$, $R'O(R_2SiO)_dR'$, $(R_3Si)_2NR''$, $(R_2SiNR'')_e$, and mixtures of the same where each R' is hydrogen or R'', each R'' is an alkyl radical of from 1 to 4 inclusive carbon atoms, each Y is —OH, —OR', —NHR'' or —NR''$_2$, e has an average value of from 3 to 6 inclusive, and n has an average value of from 2 to 3 inclusive and wherein the wet, fluid filler composition in obtained from the alkaline hydrolysis of $Si(OCH_3)_4$ in the presence of at least 70% of one-half of the stoichiometric amount of water required to completely hydrolyze the theoretical amount of —OCH$_3$ radicals present in the $Si(OCH_3)_4$, at least one alcohol selected from the group consisting of methanol, ethanol, n-propanol and isopropanol, at least one of said organosilicon hydrophobing compounds, and at least one basic catalyst.

76. The composition as claimed in claim 67 wherein said organosiloxy units of said filler are derived from organosilicon hydrophobing compounds selected from the group consisting of $R_nSiY_{4-n}$, $(R_3Si)_2NH$, $(R_3Si)_2O$, $(R_2SiO)_e$, $(R_2SiNH)_e$, $R'O(R_2SiO)_dR'$, $(R_3Si)_2NR''$, $(R_2SiNR'')_e$, and mixtures of the same where each R' is hydrogen or R'', each R'' is an alkyl radical of from 1 to 4 inclusive carbon atoms, each Y is —OH, —OR', —NHR'' or —NR''$_2$, e has an average value of from 3 to 6 inclusive, and n has an average value of from 2 to 3 inclusive and wherein the wet, fluid filler composition is obtained from the alkaline hydrolysis of $Si(OCH_3)_4$ in the presence of at least 70% of one-half of the stoichiometric amount of water required to completely hydrolyze the theoretical amount of —OCH$_3$ radicals present in the $Si(OCH_3)_4$, at least one alcohol selected from the group consisting of methanol, ethanol, n-propanol and isopropanol, at least one of said organosilicon hydrophobing compounds, and at least one basic catalyst.

* * * * *

UNITED STATES PATENT AND TRADEMARK OFFICE
CERTIFICATE OF CORRECTION

PATENT NO. : 4,418,165
DATED : November 29, 1983
INVENTOR(S) : Keith E. Polmanteer, Harry L. Chapman It is certified that error appears in the above-identified patent and that said Letters Patent is hereby corrected as shown below:

In column 1, line 24, "fine" should read -- find --.

In column 4, line 54, "Radicals" should read -- radicals --.

In column 15, line 36, "associated" should read -- associate --.

In column 32, line 9, "devolatilze" should read -- devolatilize --.

In column 35, line 13, " used to" should read -- used was to --.

In column 40, line 59, "passed" should read -- based --.

Signed and Sealed this

Twenty-second Day of January 1985

[SEAL]

Attest:

DONALD J. QUIGG

Attesting Officer     Acting Commissioner of Patents and Trademarks